US007483762B2

(12) United States Patent
Muro et al.

(10) Patent No.: US 7,483,762 B2
(45) Date of Patent: Jan. 27, 2009

(54) METHOD OF CONTROLLING PARTS PROCESSING STAGES, AND PROGRAM TO CONTROL PARTS PROCESSING STAGES

(75) Inventors: Yukio Muro, Kanagawa (JP); Aki Ishibashi, Tokyo (JP); Toshiaki Kanda, Kanagawa (JP); Kazuto Misu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1426 days.

(21) Appl. No.: 10/364,469

(22) Filed: Feb. 12, 2003

(65) Prior Publication Data

US 2003/0154146 A1    Aug. 14, 2003

(30) Foreign Application Priority Data

Feb. 13, 2002   (JP) ............................. 2002-035545

(51) Int. Cl.
*G06F 19/00* (2006.01)
(52) U.S. Cl. .................................. 700/108; 700/97
(58) Field of Classification Search ............... 700/95, 700/97–101, 106–108, 115; 705/7–8, 28–29; 709/110
See application file for complete search history.

(56) References Cited

U.S. PATENT DOCUMENTS

| | | | |
|---|---|---|---|
| 6,438,440 B1 * | 8/2002 | Hayashi | 700/121 |
| 6,578,006 B1 * | 6/2003 | Saito et al. | 705/9 |
| 6,862,484 B2 * | 3/2005 | Hayashi | 700/73 |
| 2003/0074377 A1 * | 4/2003 | Gupta et al. | 707/203 |

FOREIGN PATENT DOCUMENTS

| | | | |
|---|---|---|---|
| JP | 57-083886 A | 5/1982 |
| JP | 03-270916 A | 12/1991 |
| JP | 4-223849 | 8/1992 |
| JP | 7-78206 | 3/1995 |
| JP | 10-508131 A | 8/1998 |
| JP | 11-338919 A | 12/1999 |
| JP | 2000-322119 A1 | 11/2000 |
| JP | 2001-512599 A | 8/2001 |
| JP | 2002-015030 A | 1/2002 |
| JP | 2002-027185 A | 1/2002 |
| JP | 2002-041124 A | 2/2002 |

OTHER PUBLICATIONS

Hayashi et al., A New Manufactring Control System using Mahalanobis Distance for Maximising Productivity, Jun. 1, 2001, IEEE, 59-62.*

* cited by examiner

*Primary Examiner*—Kidest Bahta
(74) *Attorney, Agent, or Firm*—Morrison & Foerster LLP

(57) ABSTRACT

The present invention provides a parts processing stage control method and a parts processing stage controlling program by which the progress in parts processing can be instantly recognized. In accordance with the method and program of the present invention, a control computer records the starts times and the end times of pre-processing, main-processing, and post-processing, in a performance time memory unit in a parts processing operation. Based on a performance report as to each storage box, the control computer also records the completion time and the produced quantity for each storage box through the reading of the bar code on the packaging card attached to each storage box

20 Claims, 18 Drawing Sheets

FIG.23

FACILITY NAME: NO. 1 ~81

| PARTS NUMBER | A111 |
| --- | --- |
| PLANNED QUANTITY | 1872 |
| PRODUCED QUANTITY | 0 |
| NUMBER OF CARDS READ/ISSUED | 0/0 |
| DESIGNATION IDENTIFIER | A1201 |
| UNREAD PLANNED DATE | 2001/12/20 |
| NEXT PRODUCTION PLAN | A122 |

~82, ~83

FACILITY CONDITION ~90
EXECUTION STATE ~91
EXECUTION TIME AND DATE  2001/12/20 10:35 ~92
PRESS OK BUTTON TO REPORT A PRODUCTION END
[OK] ~93

DESIGNATION IDENTIFIER: ~94
SERIAL NUMBER: ~95
QUANTITY: ~96

~97 ~98 ~99

USED ONLY FOR KEYBOARD INPUTTING
[ENTER] ~100

[DETAILS] 101  [HOLD] 102  [DEFECT SOLUTION] 103  [FINISH] 104  [STOP/TURN-OFF] 105

DISPLAY PERIOD: ☐ DAYS  —112

FACILITY NAME: NO.1  —111

110

113

| ORDER | DATE | PARTS NUMBER | STATUS | PLANNED QUANTITY | PRODUCED QUANTITY | | TO BE SHIPPED | DEFECT QUANTITY | | |
|---|---|---|---|---|---|---|---|---|---|---|
| | | | | | PRODUCED | SHIPPED | | OCCURRENCES | SOLVED | UNSOLVED |
| 01 | 2001/12/20 | D100 | PROCESSING COMPLETED | 1944 | 2017 | 0 | 2017 | 0 | 0 | 0 |
| 02 | 2001/12/20 | A100 | HELD | 648 | 24 | 0 | 24 | 0 | 0 | 0 |
| 03 | 2001/12/20 | A111 | PROCESSING | 1872 | 600 | 0 | 600 | 0 | 0 | 0 |
| 04 | 2001/12/23 | A112 | NOT STARTED | 2160 | 0 | 0 | 0 | 0 | 0 | 0 |

ITEM DESIGNATION (CHECK AN ITEM AND PRESS ENTER)    ORDER: AFTER ☐  —115

☐ RETURN TO THE PREVIOUS STATE
114 ☐ RECOVER THE HELD INSTRUCTION
    ☐ SELECT A PARTS NUMBER TO BE PROCESSED NEXT
    ☐ MAKE A DEFECT REPORT

ENTER  —116

PERFORMANCE REPORT  —117

FIG.25

FACILITY NAME: NO. 1

DESIGNATION IDENTIFIER: A1201

PARTS NUMBER: A111

QUANTITY:

DEFECT CODE:

CAUSE CODE:

[PERFORMANCE REPORT] [DETAILS] [ENTER]

FIG.26

| | | |
|---|---|---|
| PARTS NUMBER | A111 | |
| QUANTITY | 24 | |
| NAME | DEVELOPMENT | |
| SECTION/ STEP | M01 | DESIGNATION IDENTIFIER | A1201 |
| FACILITY | NO.1 | PLANNED DATE | 2001/12/20 |
| | | ISSUE NUMBER | 25/78 |
| | | PROCESSING DATE | |
| | | PROCESSOR NAME | |

PACKAGING CARD — 140
141 PARTS NUMBER
142 QUANTITY
143 NAME
144 SECTION/STEP
145 FACILITY
146 DESIGNATION IDENTIFIER
147 PLANNED DATE
148 ISSUE NUMBER
149 (barcode)

FIG.27

DAILY REPORT SCREEN — TIME AND DATE: 2001/12/21 09:30

PRODUCED QUANTITY

| PARTS NUMBER | DESIGNATION IDENTIFIER | FACILITY NAME | STATUS | PLANNED QUANTITY | COMPLETED QUANTITY | EXCESS OR SHORTAGE | STOCK | TOTAL EXCESS OR SHORTAGE | DEFECT QUANTITY | PLANNED YIELD | ACHIEVED YIELD |
|---|---|---|---|---|---|---|---|---|---|---|---|
| D100 | A1011 | NO.1 | PRODUCTION COMPLETED | 12,780 | 12,530 | ▲250 | 15 | ▲3,650 | 3 | 99.00 | 99.97 |
| ... | ... | ... | ... | ... | ... | ... | ... | ... | ... | ... | ... |

▶ DELAY IN PROCESSING

| A100 | A2001 | NO.1 | PRODUCTION COMPLETED | 6,000 | 5,950 | ▲50 | 0 | ▲120 | | | |

QUALITY

| PARTS NUMBER | FACILITY NAME | DEFECT CONTENTS | DEFECT QUANTITY | UNSOLVED | MONTHLY TOTAL OCCURRENCES | PLANNED YIELD | ACHIEVED YIELD |
|---|---|---|---|---|---|---|---|
| A100 | MOLD NO.1 | ***** | 10 | 0 | 57 | 0 | 0 |
| ... | ... | ... | ... | ... | ... | ... | ... |

PRODUCTIVITY

[PROCESSING]

| | PARTS NUMBER | DESIGNATION IDENTIFIER | FACILITY NAME | STATUS | PLANNED TIME | ACTUAL PERFORMANCE TIME | DIFFERENCE | SUSPENSION TIME | PLANNED TACT TIME | ACTUAL TACT TIME | DIFFERENCE |
|---|---|---|---|---|---|---|---|---|---|---|---|
| ▶ NO.1 | A100 | A1001 | NO.1 | PRODUCTION COMPLETED | 18.0 3.00 | 18.5 3.50 | 30 30 | 50 30 | 7.6 ... | 9.6 ... | 2.0 ... |

[SETUP]
PRE-PROCESSING

| | PARTS NUMBER | DESIGNATION IDENTIFIER | FACILITY NAME | STATUS | PLANNED TIME | ACTUAL PERFORMANCE TIME | DIFFERENCE |
|---|---|---|---|---|---|---|---|
| NO.1 | A100 | A1001 | NO.1 | PRODUCTION COMPLETED | 4.50 1.00 | 4.50 1.00 | 0 0 |
| ... | ... | ... | ... | ... | ... | ... | ... |

POST-PROCESSING

[FACILITY STOPPED]

| | CAUSE OF SUSPENSION | SUSPENSION START TIME | SUSPENSION END TIME | SUSPENSION TIME |
|---|---|---|---|---|
| ▶ NO.1 | DAILY CHECKUP | 08:35 | 08:55 | 50 20 |
| ... | ... | ... | ... | ... |

METHOD OF CONTROLLING PARTS PROCESSING STAGES, AND PROGRAM TO CONTROL PARTS PROCESSING STAGES

BACKGROUND OF THE INVENTION

1. Field of the Invention

The present invention relates to a production control system, and, more particularly, to a method of controlling parts processing stages and a system for controlling part processing stages.

2. Description of the Related Art

Conventionally, workers who carry out parts processing operations keep a record of processed parts in parts processing stages, and find the total number of the processed parts from the record at the end of each working day.

Japanese Laid-Open Patent Application No. 2000-322119 discloses a production system for conducting production control based on lot numbers. In this system, the start and the completion of each process are registered with each lot, so that progress in production of each lot can be monitored.

In the conventional method of finding the total number of processed parts at the end of each working day, however, real-time progress in processing cannot be monitored. As a result, there might be a delay in discovering an error or failure, such as production of defective parts through the processing stages, or hang-up or suspension of the processing machines and facility. If there is a delay in discovering an error or failure, it is difficult to find out in which stage the error or failure has occurred. Furthermore, by the conventional method of finding the total number of processed parts at the end of each working day, real-time process in processing operations cannot be monitored.

Japanese Laid-Open Patent Application No. 2000-322119 does not specify what a lot unit is made of, and does not either disclose a specific mechanism for monitoring real-time progress in processing.

SUMMARY OF THE INVENTION

A general object of the present invention is to provide a production control system in which the above disadvantages are eliminated.

A more specific object of the present invention is to provide a method of controlling a parts processing stage and a program to control a parts processing stage, by which real-time progress in a parts processing operation can be constantly monitored.

The above objects of the present invention are achieved by a method of controlling a parts processing stage by means of a computer. This method includes the steps of: dividing a processing planned quantity recorded in a processing plan memory into a plurality of units; recording a start time of a parts processing operation in a start time memory; and recording the time of a completion report as to the parts processing operation carried out for each unit number of parts. In this method, the unit number being equivalent to each of the units, and all the steps are carried out by the computer.

By this method of controlling a parts processing stage, the computer records the start time of a parts processing operation, while recording the time of a completion report as to the processing operation carried out for each unit number of parts. The unit number is determined by dividing the parts processing planned quantity into a plurality of units. Thus, the processing condition of each unit number of parts can be monitored.

In the above method of controlling a parts processing stage, the unit number is equal to a storage capacity number that indicates the number of parts that can be stored in each one storage means for storing completed parts for which the parts processing operation has been completed in the parts processing stage.

By this method, the unit number is equal to the storage capacity number of parts that can be stored in one storage means. Accordingly, the processing condition of parts to be stored in each one storage means can be collectively monitored.

In the above method of controlling a parts processing stage, the step of dividing the processing planned quantity includes the steps of: calculating the number of storage means required for storing all the completed parts, based on the storage capacity number with respect to each storage means and the processing planned quantity; and allocating a storage means identifier for identifying each of the calculated number of storage means required for storing all the completed parts.

By this method, the computer calculates the number of required storage means from the storage capacity number of parts with respect to each storage means and the processing planned quantity. The computer then allocates a storage means identifier for identifying each of the required storage means. Thus, a storage means identifier can be allocated to each of the required storage means, and the time of the completion report with respect to each storage means can be obtained.

The above method of controlling a parts processing stage further includes the step of outputting a medium on which the storage means identifier and the storage capacity number are recorded as information that can be read by a reading means. This step is also carried out by the computer. In this method, the step of recording the time of a completion report includes the steps of: reading the information by the reading means from the medium outputted in the step of outputting the medium; and recording the time of a completion report based on the read time of the information, while also recording the storage means identifier and the storage capacity number contained in the information that has been read by the reading means.

By this method, the computer outputs a medium on which a storage means identifier and a storage capacity number are recorded as information that can be read by a reading means. The computer then reads the information from the medium, and records a report time based on the read time of the information, as well as the storage means identifier and the storage capacity number contained in the information. Accordingly, as well as the report time, the storage capacity number determined for each storage means identifier can be readily inputted as a produced number.

The above method of controlling a parts processing stage further includes the steps of: recording the storage means identifier in a storage means identifier memory; accepting a completion report input with respect to the parts processing operation; comparing a storage means identifier read by the reading means with storage means identifiers recorded in the storage means identifier memory, when a completion report input is accepted in the step of accepting a completion report input; and outputting an alert when the storage means identifier read by the reading means is not the same as any of the storage means identifiers recorded in the storage means identifier memory, as a result of the comparing step. These steps are also carried out by the computer.

By this method, the computer records storage means identifiers in the storage means identifier memory. The computer also accepts a complete report input in the parts processing stage, and compares a storage means identifier read by the reading means with the storage means identifiers recorded in the storage means identifier memory. If the storage means identifier read by the reading means is not the same as any of the storage means identifiers recorded in the storage means identifier memory, the computer outputs an alert. Accordingly, a notification can be outputted when there is a storage means identifier that have has not been read by the reading means among the storage means identifiers recorded in the storage means identifier memory. Thus, all the information can be read from the medium.

The above method of controlling a parts processing stage further includes the step of calculating a processing time required for processing the unit number of parts, from the start time of the parts processing operation and the time of the completion report. This step is also carried out by the computer.

By this method, the computer calculates a processing time required for processing each unit number of parts, based on the start time of the parts processing operation and the report time. Thus, the processing time required for processing each unit number of parts can be determined.

The above method of controlling a parts processing stage further includes the steps of:

recording a processing suspension start time that indicates the time of suspending the parts processing operation, in a processing suspension start time memory; recording a processing resumption time that indicates the time of resuming the suspended parts processing operation, in a processing resumption time memory; and calculating an actual processing time required for processing each unit number of parts, based on the processing time, the processing suspension start time, and the processing resumption time. These steps are also carried out by the computer.

By this method, the computer records a processing suspension start time that indicates the time of suspending the parts processing operation, and a processing resumption time that indicates the time of resuming the parts processing operation. The computer then calculates an actual processing time required for processing each unit number of parts, based on the processing time, the processing suspension start time, and the processing resumption time. Thus, even if the parts operation is suspended, the actual processing time can be obtained by subtracting the suspended period of time from the processing time.

In the above method of controlling a parts processing stage, the parts processing stage is divided into a preparation stage and a main processing stage that are essential for the parts processing operation. This method further includes the steps of: recording a start time and a finish time of each of the preparation stage and the main processing stage, in a divided stage time memory; and calculating an operation time of a parts processing facility in each of the divided stages, based on the start times and end times recorded in the divided stage time memory. These steps are also carried out by the computer.

By this method, the parts processing stage is divided into at least a preparation stage and a main processing stage for the parts processing operation. The computer records the start time and the finish time of each of the divided stages, and calculates the operation time of the parts processing facility in each of the divided stages, based on the start times and the finish times of the divided stages. Thus, the operation time of the parts processing facility can be readily obtained in each of the divided stages.

The above method of controlling a parts processing stage further includes the steps of: accepting a defect occurrence input through an input means into which a defect occurrence report is inputted; accepting a defect contents input through an input means into which defect contents corresponding to the defect occurrence input are inputted; and associating defect information such as the time of the defect occurrence input and the defect contents with a designation identifier for identifying the parts processing stage designated in each parts processing plan, and then recording the defect information in a defect information memory in association with the designation identifier. These steps are also carried out by the computer.

By this method, the computer accepts a defect occurrence input, and also accepts a defect contents input through an input means into which the defect contents corresponding to the defect occurrence input are inputted. The computer then records the time of the defect occurrence input and the defect contents in association with a designation identifier for identifying the parts processing stage designated in each parts processing plan. Thus, the defect occurrence time can be accurately detected, and the defect contents can be immediately grasped.

The above method of controlling a parts processing stage further includes the step of outputting a medium on which code information classified under defect contents is recorded as information that can be read by a reading means. This step is also carried out by the computer. In this method, the step of associating defect information includes the steps of: reading the information recorded on the medium; and recording the defect contents based on the code information contained in the information read by the reading means.

By this method, the computer outputs a medium on which code information classified under defect contents is recorded as information that can be read by a reading means. The computer then reads the information from the medium by the reading means, and records defect contents based on the code information contained in the read information. Thus, the operation of inputting defect contents can be simplified.

In the above method of controlling a parts processing stage, the processing planned quantity of parts is a processing planned quantity of parts to be processed at a predetermined parts processing facility in a predetermined period of time.

By this method, the processing planned quantity of parts is equal to the processing planned quantity of parts to be processed at a predetermined parts processing facility in a predetermined period of time. Accordingly, the parts processing stage can be controlled in each part processing plan at the predetermined parts processing facility in the predetermined period of time.

The above method of controlling a parts processing stage further includes the steps of: recording the designation identifier with respect to the designating parts processing plan, in an execution designation identifier memory; recording the designation identifier recorded in the execution designation identifier memory, as information that can be read by the reading means, on the medium outputted in the step of outputting the medium; comparing a designation identifier read by the reading means with designation identifiers recorded in the execution designation identifier memory; and outputting an alert when the designation identifier read by the reading means is not the same as any of the designation identifiers recorded in the execution designation identifier memory as a result of the comparing step. These steps are also carried out by the computer.

By this method, the computer records the designation identifier of the designating parts production plan in an execution designation identifier memory. The computer also outputs the medium on which a designation identifier recorded in the execution designation identifier memory is recorded as information that can be read by a reading means. The computer then compares a designation identifier read by the reading means with designation identifiers recorded in the execution designation identifier memory. If the designation identifier read by the reading means is not the same as any of the designation identifiers recorded in the execution designation identifier memory, the computer outputs an alert. Accordingly, a notification can be issued when a designation identifier that is different from the designation identifier corresponding to the designating parts processing plan. Thus, reading of wrong information from the medium can be prevented.

The above objects of the present invention are also achieved by a program to control a parts processing stage by means of a computer. In this program, the computer functions as: a divider that divides a processing planned quantity of parts recorded in a processing plan memory into a plurality of units; a start time memory in which a start time of a parts processing operation is recorded; and a report acceptance memory in which the time of a parts completion report as to the parts processing operation carried out for each unit number of parts is recorded. Here, the unit number is equivalent to each of the units.

By this program, the computer records the start time of a parts processing operation, while recording the time of a completion report as to the processing operation carried out for each unit number of parts. The unit number is determined by dividing the parts processing planned quantity into a plurality of units. Thus, the processing condition of each unit number of parts can be monitored.

In the above program to control a parts processing stage, the unit number is equal to a storage capacity number that indicates the number of parts that can be stored in each one storage means for storing completed parts for which the parts processing operation has been completed in the parts processing stage.

By this program, the unit number is equal to the storage capacity number of parts that can be stored in one storage means. Accordingly, the processing condition of parts to be stored in each one storage means can be collectively monitored.

In the above program to control a parts processing stage, the divider functions as: a storage means number calculator that calculates the number of storage means required for storing all the completed parts, based on the storage capacity number with respect to each storage means and the processing planned quantity; and a storage means identifier allocating unit that allocates a storage means identifier for identifying each of the calculated number of storage means required for storing all the completed parts.

By this program, the computer calculates the number of required storage means from the storage capacity number of parts with respect to each storage means and the processing planned quantity. The computer then allocates a storage means identifier for identifying each of the required storage means. Thus, a storage means identifier can be allocated to each of the required storage means, and the time of the completion report with respect to each storage means can be obtained.

In the above program to control a parts processing stage, the computer also functions as an outputting unit that outputs a medium on which the storage means identifier and the storage capacity number are recorded as information that can be read by a reading means. In this program, the report acceptance memory reads the information by the reading means from the medium outputted from the outputting unit, and records the time of a completion report based on the read time of the information, while also recording the storage means identifier and the storage capacity number contained in the information that has been read by the reading means.

By this program, the computer outputs a medium on which a storage means identifier and a storage capacity number are recorded as information that can be read by a reading means. The computer then reads the information from the medium, and records a report time based on the read time of the information, as well as the storage means identifier and the storage capacity number contained in the information. Accordingly, as well as the report time, the storage capacity number determined for each storage means identifier can be readily inputted as a produced number.

In the above program to control a parts processing stage, the computer further function as: a storage means identifier recorder that records the storage means identifier in a storage means identifier memory; a completion report accepter that accepts a completion report input with respect to the parts processing operation; a storage means identifier comparator that compares a storage means identifier read by the reading means with storage means identifiers recorded in the storage means identifier memory, when a completion report input is accepted by the completion report accepter; and a storage means identifier alert outputting unit that outputs an alert when the storage means identifier read by the reading means is not the same as any of the storage means identifiers recorded in the storage means identifier memory as a result of the comparison.

By this program, the computer records storage means identifiers in the storage means identifier memory. The computer also accepts a complete report input in the parts processing stage, and compares a storage means identifier read by the reading means with the storage means identifiers recorded in the storage means identifier memory. If the storage means identifier read by the reading means is not the same as any of the storage means identifiers recorded in the storage means identifier memory, the computer outputs an alert. Accordingly, a notification can be outputted when there is a storage means identifier that have has not been read by the reading means among the storage means identifiers recorded in the storage means identifier memory. Thus, all the information can be read from the medium.

In the above program to control a parts processing stage, the computer further functions as a processing time calculator that calculates a processing time required for processing the unit number of parts, from the start time of the parts processing operation and the time of the completion report.

By this program, the computer calculates a processing time required for processing each unit number of parts, based on the start time of the parts processing operation and the report time. Thus, the processing time required for processing each unit number of parts can be determined.

In the above program to control a parts processing stage, the computer further functions as: a processing suspension start time recorder that records a processing suspension start time that indicates the time of suspending the parts processing operation, in a processing suspension start time memory; a processing resumption time recorder that records a processing resumption time that indicates the time of resuming the suspended parts processing operation, in a processing resumption time memory; and an actual processing time calculator that calculates an actual processing time required for processing the unit number of parts, based on the processing time, the processing suspension start time, and the processing resumption time.

By this program, the computer records a processing suspension start time that indicates the time of suspending the parts processing operation, and a processing resumption time that indicates the time of resuming the parts processing operation. The computer then calculates an actual processing time required for processing each unit number of parts, based on the processing time, the processing suspension start time, and the processing resumption time. Thus, even if the parts operation is suspended, the actual processing time can be obtained by subtracting the suspended period of time from the processing time.

In the above program to control a parts processing stage, the parts processing stage is divided into a preparation stage and a main processing stage that are essential for the parts processing operation. In this program, the computer further functions as: a divided stage time recorder that records a start time and a finish time of each of the preparation stage and the main processing stage, in a divided stage time memory; and an operation time calculator that calculates an operation time of a parts processing facility in each of the divided stages, based on the start times and end times recorded in the divided stage time memory.

By this program, the parts processing stage is divided into at least a preparation stage and a main processing stage for the parts processing operation. The computer records the start time and the finish time of each of the divided stages, and calculates the operation time of the parts processing facility in each of the divided stages, based on the start times and the finish times of the divided stages. Thus, the operation time of the parts processing facility can be readily obtained in each of the divided stages.

In the above program to control a parts processing stage, the computer further functions as: a defect occurrence input accepter that accepts a defect occurrence input through an input means into which a defect occurrence report is inputted; a defect contents accepter that accepts a defect contents input through an input means into which defect contents corresponding to the defect occurrence input are inputted; and a defect information associating unit that associates defect information such as the time of the defect occurrence input and the defect contents with a designation identifier for identifying the parts processing stage designated in each parts processing plan, and then records the defect information in a defect information memory in association with the designation identifier.

By this program, the computer accepts a defect occurrence input, and also accepts a defect contents input through an input means into which the defect contents corresponding to the defect occurrence input are inputted. The computer then records the time of the defect occurrence input and the defect contents in association with a designation identifier for identifying the parts processing stage designated in each parts processing plan. Thus, the defect occurrence time can be accurately detected, and the defect contents can be immediately grasped.

In the above program to control a parts processing stage, the computer further functions as an outputting unit that outputs a medium on which code information classified under defect contents is recorded as information that can be read by a reading means. In this program, the defect information associating unit reads the information recorded on the medium, and records the defect contents based on the code information contained in the information read by the reading means.

By this program, the computer outputs a medium on which code information classified under defect contents is recorded as information that can be read by a reading means. The computer then reads the information from the medium by the reading means, and records defect contents based on the code information contained in the read information. Thus, the operation of inputting defect contents can be simplified.

In the above program to control a parts processing stage, the processing planned quantity of parts is a processing planned quantity of parts to be processed at a predetermined parts processing facility in a predetermined period of time.

In this program, the processing planned quantity of parts is equal to the processing planned quantity of parts to be processed at a predetermined parts processing facility in a predetermined period of time. Accordingly, the parts processing stage can be controlled in each part processing plan at the predetermined parts processing facility in the predetermined period of time.

The above program to control a parts processing stage, the computer further functions as: a designation identifier recorder that records the designation identifier with respect to the designating parts processing plan, in an execution designation identifier memory; an information recorder that records the designation identifier recorded in the execution designation identifier memory, as information that can be read by the reading means, on the medium outputted by the outputting unit; a designation identifier comparator that compares a designation identifier read by the reading means with designation identifiers recorded in the execution designation identifier memory; and an execution designation identifier alert outputting unit that outputs an alert when the designation identifier read by the reading means is not the same as any of the designation identifiers recorded in the execution designation identifier memory as a result of the comparison.

By this program, the computer records the designation identifier of the designating parts production plan in an execution designation identifier memory. The computer also outputs the medium on which a designation identifier recorded in the execution designation identifier memory is recorded as information that can be read by a reading means. The computer compares a designation identifier read by the reading means with designation identifiers recorded in the execution designation identifier memory. If the designation identifier read by the reading means is not the same as any of the designation identifiers recorded in the execution designation identifier memory, the computer outputs an alert. Accordingly, a notification can be issued when a designation identifier that is different from the designation identifier corresponding to the designating parts processing plan. Thus, reading of wrong information from the medium can be prevented.

BRIEF DESCRIPTION OF THE DRAWINGS

The above and other objects, features, and advantages of the present invention will become more apparent from the following detailed description taken in conjunction with the accompanying drawings in which:

FIG. 23 illustrates a performance reporting screen outputted to the display unit of the operation terminal;

FIG. 24 illustrates a details display screen outputted to the display unit of the operation terminal;

FIG. 25 illustrates a defect reporting screen outputted to the display unit of the operation terminal;

FIG. 26 illustrates a packaging card to be attached to each storage box; and

FIG. 27 illustrates a daily report display screen outputted to the display unit of a control terminal.

DESCRIPTION OF THE PREFERRED EMBODIMENTS

The following is a detailed description of embodiments of the present invention, with reference to the accompanying drawings. A method of controlling parts processing stages and a system for controlling parts processing stages will be described as the embodiments of the present invention.

Figure 1:
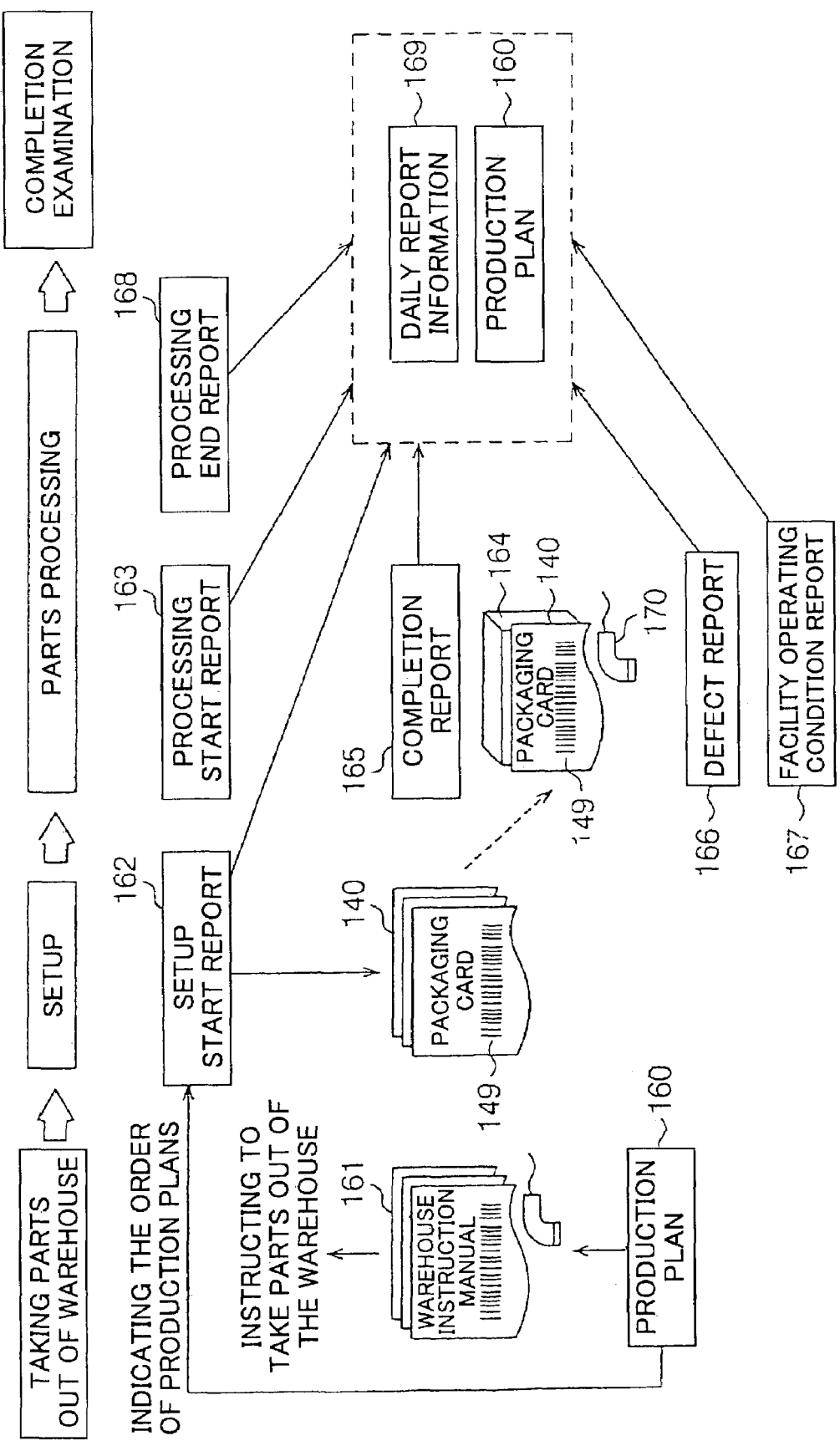
FIG. 1 illustrates an operation in accordance with an embodiment of the present invention.

FIG. 1 shows a parts processing operation including parts processing stages of this embodiment. As shown in FIG. 1, a step of taking unprocessed parts out of a warehouse, a setup step, a parts processing step, and a step of examining completed parts, are carried out in this order in this parts processing operation. The parts processing stages of this embodiment are equivalent to the setup step and the part processing step.

Prior to the parts processing operation, a production plan 160 that indicates a planned date and a processing facility to be used is made through a production planning operation. On the actual day of the parts processing operation, processing instructions are added to the production plan 160 through a schedule management operation. In accordance with the processing instructions, parts processing is carried out in the parts processing operation based on the production plan 160.

First, in the step of taking unprocessed parts out of a warehouse, another system (such as a production control system) automatically outputs a warehouse instruction manual 161 about unprocessed parts, based on the production plan 160. Operators take the unprocessed parts out of the warehouse in accordance with the warehouse instruction manual 161.

In the setup step, an operator input a setup start report 162 through a terminal connected to a server. Upon receipt of the setup start report 162, the server automatically outputs packaging cards 140 each having a bar code 149 printed thereon. The number of packaging cards 140 is equivalent to the number of storage boxes 164 required as storage means for storing completed parts. The bar code 149 contains information for identifying the production plan 160, information for identifying the corresponding storage box 164, and the number of parts to be stored in the storage box 164. Each of the packaging cards 140 also shows information for identifying the production plan 160 and the parts number of the completed parts through the parts processing stages. These packaging cards 140 serve as a process instruction manual, and operators carry out processes according to the packaging cards 140.

In the next parts processing step, each operator inputs a processing start report 163 through the terminal according to the packaging cards 140. After completing the processing for parts to be stored in one storage box 164, the operator places the completed parts into the storage box 164. The operator then reads the bar code 149 from the packaging card 140 with a bar code reader 170 connected to the terminal, and attaches the packaging card 140 onto the storage box 164. In doing so, the operators input a completion report 165 for each storage box 164, using the packaging cards 140.

Meanwhile, if defects are detected from the parts, the operators input a defect report 166 through the terminal each time a defect is detected. Also, the operators input a facility operating condition report 167 through the terminal, specifying the facility operating conditions such as the operation rate or suspension of the processing facility. When ending the parts processing, the operators input a processing end report 168.

The server automatically produces daily report information 169, based on the setup start report 162, the processing start report 163, the completion report 165, the defect report 166, the facility operating condition report 167, and the processing end report 168, which have been inputted separately from one another. Further, based on the information recorded in the server according to these reports 162, 163, 165, 166, and 167, another system (such as a production control system) outputs a completion voucher. The completed parts are then passed on to the completed parts examination step. On the other hand, the manager monitors whether the parts processing is being carried out in accordance with the production plan 160, from the daily report screen displayed on the terminal based on the daily report information 169. Also, the production plan 160 is reconsidered, depending on the reports 162, 163, 165, 166, and 167.

In the following, the setup step and the parts processing step will be described in greater detail. In this embodiment, the parts processing stages are controlled with a production control server in a factory that manufactures the parts. Here, operators input reports such as performance reports using an operation terminal.

Figure 2:
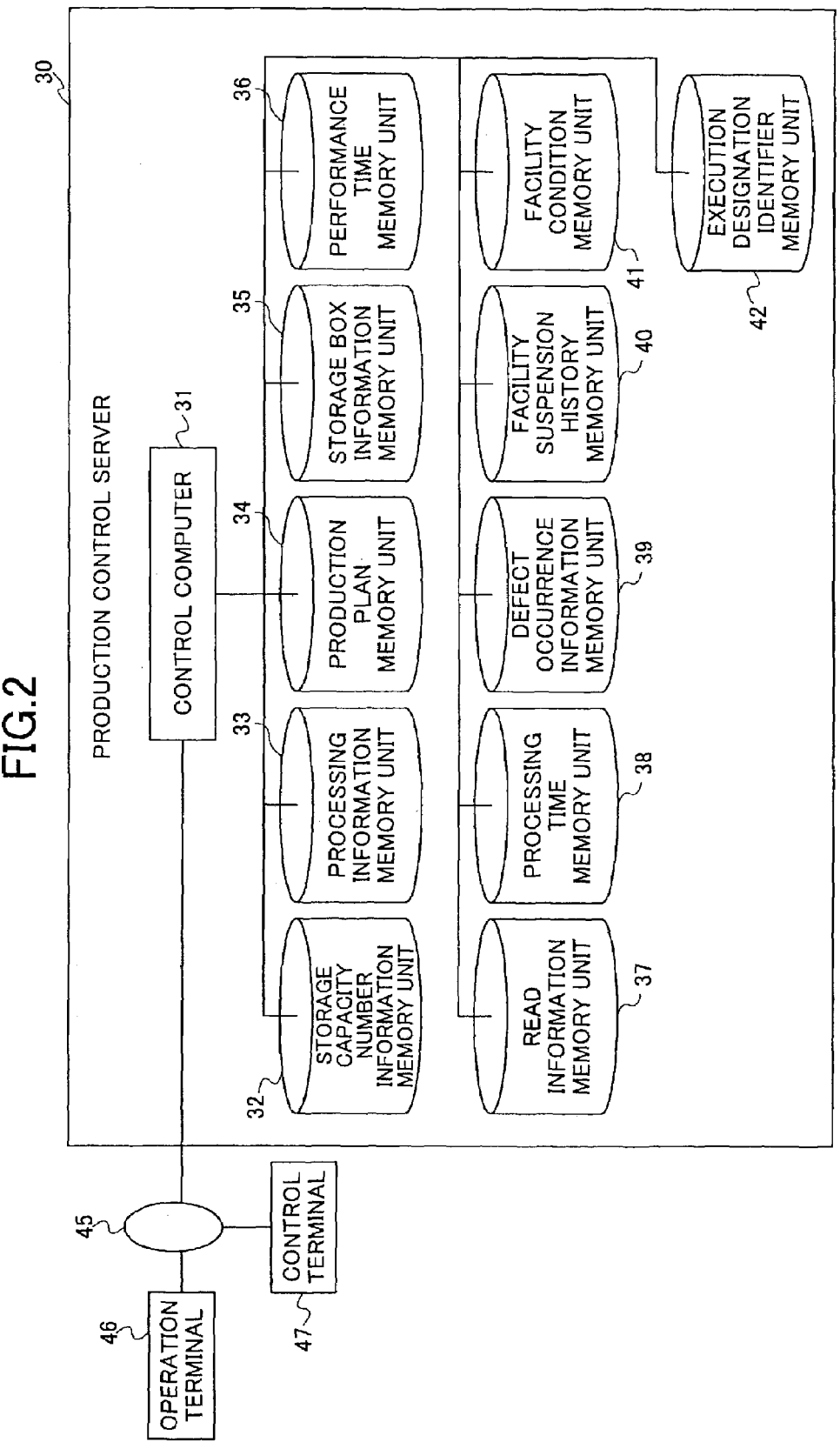
FIG. 2 is a schematic view of a system in accordance with the embodiment of the present invention.

As shown in FIG. 2, a production control server 30 is connected to an operation terminal 46 and a control terminal 47 via a network 45. Operators input various reports such as performance reports into the operation terminal 46 to transmit data such as performance report data to the production control server 30. On the other hand, the control terminal 47 is used to display the daily report screen for the manager to make a new production plan and manage the production. Therefore, the terminals 46 and 47 perform data input, data transmission and reception with the production control server 30, and data display. In view of this, each of the terminals 46 and 47 includes a control unit (a CPU, not shown), a memory unit (such as a RAM, a ROM, or a hard disk), a communication unit, a display control unit (such as a monitor), and an input unit (such as a keyboard and a mouse). The operation terminal 46 further includes the bar code reader 170 for reading in the bar code 149 printed on each of the packaging cards 140.

The production control server 30 includes a control computer 31, as shown in FIG. 2. The control computer 31 includes a control unit (a CPU, not shown), a memory unit (such as a RAM, a ROM, or a hard disk), and a communication unit. This control computer 31 executes a parts processing stage controlling program so as to control the parts processing stages. The parts processing stage controlling program is made up of various programs such as an execution state controlling program, a performance reporting program, a defect reporting program, a facility operation reporting program, and a daily report producing program. The control computer 31 executes these various programs to perform data transmission and reception, as well as data processing described later. In this embodiment, the control computer 31 functions as an allocating unit, a report recording unit, a processing time calculating unit, a storage unit number calculating unit, a storage unit identifier attaching unit, an output unit, a completion report receiving unit, and a storage unit identifier comparing unit. The control computer 31 also functions as a storage unit alert output unit, an actual processing time calculating unit, an operating time calculating unit, a defect report receiving unit, a defect details receiving unit, a defect information associating unit, a designation identifier comparing unit, and an execution designation identifier alerting unit. More specifically, the execution state controlling program is a program to control the execution state in the parts processing. The performance reporting program is a program to receive and record performance reports during the parts processing. The defect reporting program is a program to receive and record the defect report 166. The facility operation reporting program is a program to receive and record the facility operating condition report 167. The daily report producing program is a program to produce data for outputting the daily report information 169 as to the parts processing, based on the data recorded according to the performance reports, the defect report 166, and the facility operating condition report 167 during the parts processing.

A storage capacity information memory unit 32, a processing information memory unit 33, a production plan memory unit 34, and a storage box information memory unit 35 as a storage identifier memory unit, are connected to the control computer 31. Also, a performance time memory unit 36 as a start time memory unit and a divided processing time memory unit, a read information memory unit 37 as a reporting time memory unit, and a processing time memory unit 38, are connected to the control computer 31. Further, a defect occurrence information memory unit 39, a facility suspension history memory unit 40 as a processing suspension start time memory unit and a processing resumption time memory unit, and a facility condition memory unit 41, are connected to the control computer 31. Moreover, an execution designation identifier memory unit 42 is connected to the control computer 31.

Figure 3:
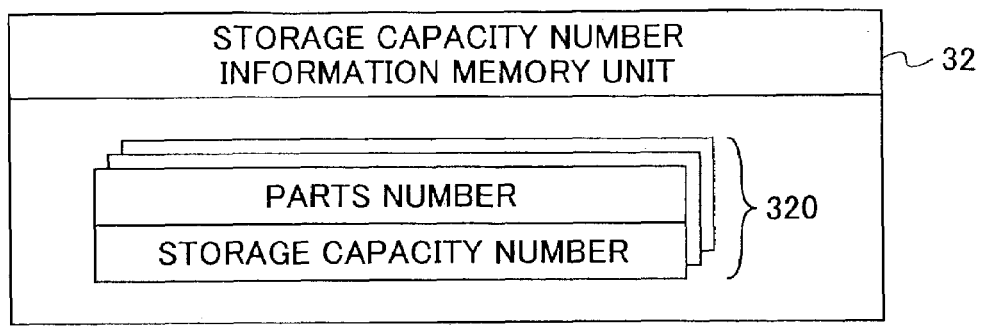
FIG. 3 illustrates the data recorded in a storage capacity number information memory unit.

In the storage capacity information memory unit 32, storage capacity information 320 is recorded for each parts number, as shown in FIG. 3. In this embodiment, the storage capacity information 320 consists of a parts number and a storage capacity number. The parts number is an identifier for identifying each completed part after the processing. The storage capacity number is the number of completed parts that can be stored in one storage box 164. The storage capacity information 320 is set in advance of the parts processing of this embodiment.

Figure 4:
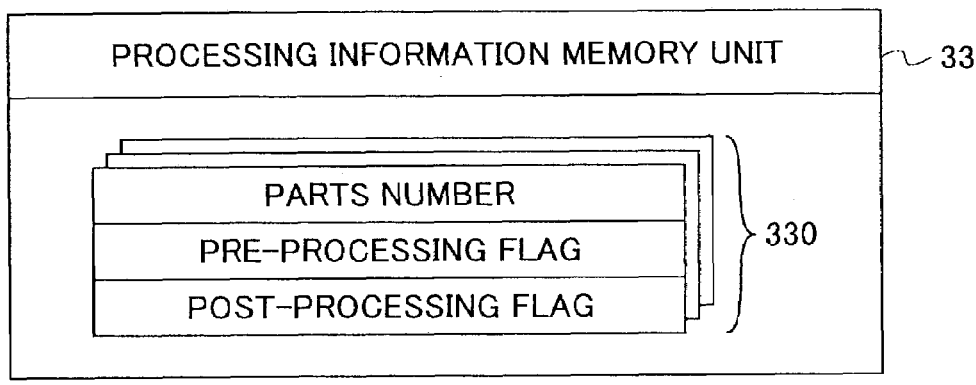
FIG. 4 illustrates the data recorded in a processing information memory unit.

In the processing information memory unit 33, processing information 330 is recorded for each parts number, as shown in FIG. 4. In this embodiment, the processing information 330 consists of a parts number, a pre-processing flag, and a post-processing flag. The parts number is an identifier for identifying each completed part after the processing, and is equivalent to the parts number contained in the corresponding storage capacity information 320. The pre-processing flag shows whether pre-processing is required when a part of the parts number is to be processed. The post-processing flag shows whether post-processing is required when a part of the parts number is to be processed. The parts processing step of producing complete parts of each parts number is divided into a pre-processing step as a preparation step for the parts processing, a main processing step, and a post-processing step for the parts processing. The pre-processing step and the post-processing step may not be necessary, depending on the parts processing stages. Here, the processing information 330 is set in advance of the parts processing of this embodiment.

Figure 5:
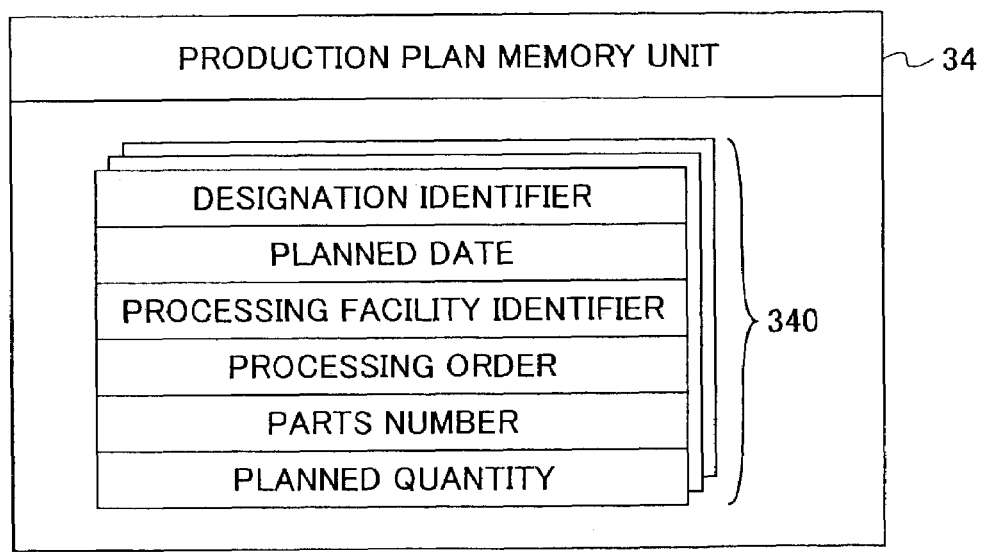
FIG. 5 illustrates the data recorded in a production plan memory unit.

In the production plan memory unit 34, production plan information 340 is recorded for each designation identifier, as shown in FIG. 5. In this embodiment, the production plan information 340 consists of a designation identifier, a planned date, a processing facility identifier, a processing order, a parts number, and a planned quantity. The designation identifier is an identifier for identifying a processing instruction, and is set for each planned date, each processing facility identifier, and each parts number. In a case where completed parts of the same parts number are to be produced on the same day at different processing facilities, different designation identifiers are allocated depending on the processing facilities. The processing facility identifier is an identifier for identifying the processing facility to be used in the production plan. In this embodiment, a plurality of factories has a plurality of processing facilities, and each factory and each processing facility are identified with a processing facility identifier. The processing order shows the order of processing at each processing facility on the same date. The parts number is an identifier for identifying each completed part to be produced in accordance with the production plan, and is equivalent to the parts number contained in the corresponding storage capacity information 320. The planned quantity indicates the number of parts to be processed in accordance with the production plan designated by the designation identifier. Here, the production plan information 340 is set in advance of the parts processing of this embodiment, through the production planning operation based on order receipt information and stock information recorded in the memory unit (not shown).

Figure 6:
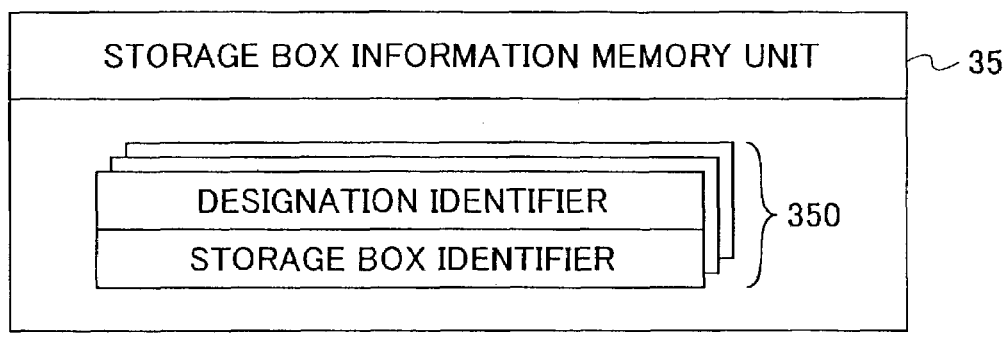
FIG. 6 illustrates the data recorded in a storage box information memory unit.

In the storage box information memory unit 35, storage box information 350 is recorded for each designation identifier, as shown in FIG. 6. In this embodiment, the storage box information 350 contains a designation identifier and a storage box identifier. The designation identifier is an identifier for identifying a processing instruction, and is equivalent to the designation identifier contained in the corresponding production plan information 340. The storage box identifier is an identifier for identifying the corresponding one of the storage boxes 164 to store the parts to be processed. Storage box identifiers are allocated as serial numbers with respect to designation identifiers. Also, the storage box identifiers are allocated by the control computer 31, and are recorded in the storage box information 350, when a start in a process instruction operation is reported, as described later.

Figure 7:
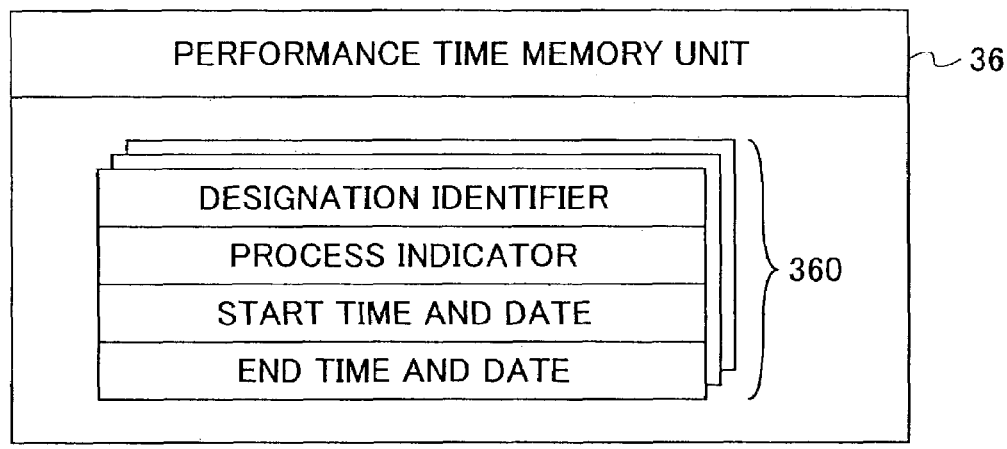
FIG. 7 illustrates the data recorded in a performance time memory unit.

In the performance time memory unit 36, performance time information 360 is recorded for each designation identifier, as shown in FIG. 7. In this embodiment, the performance time information 360 consists of a designation identifier, a process indicator, start time and date, and end time and date. The designation identifier is an identifier for identifying a processing instruction, and is equivalent to the designation identifier contained in the corresponding production plan information 340. The process indicator designates one of the steps among the pre-processing, the main processing, and the post-processing step. The start time and date and the end time and date indicate the start time and date and the end time and date of the pre-processing step, the main processing step, or the post-processing step, whichever is designated by the process indicator. When any of the setup start report 162, the processing start report 163, or a post-processing start report is received, the designation identifier, the process indicator, and the start time and date, are recorded in the performance time information 360. The input time and date of a pre-processing end report, a main processing end report, or a post-processing end report are then recorded as the end time and date.

Figure 8:
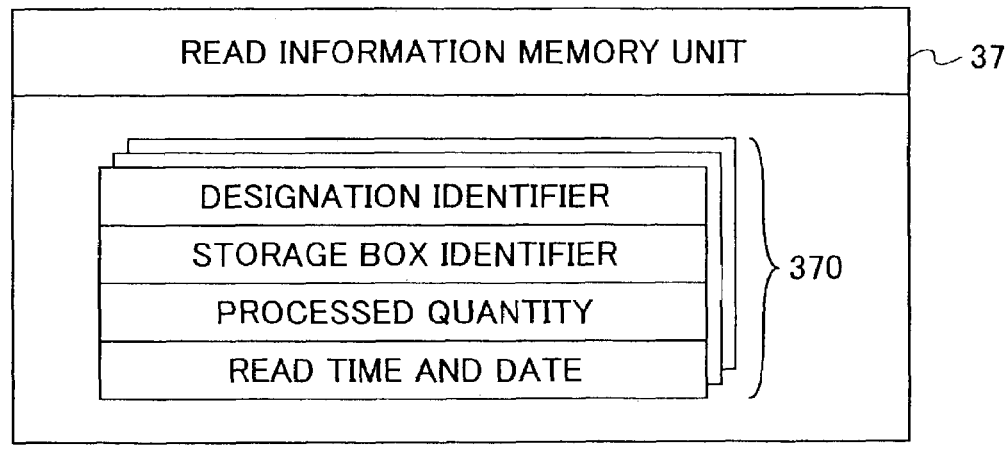
FIG. 8 illustrates the data recorded in a read information memory unit.

In the read information memory unit 37, read information 370 is recorded for each corresponding designation identifier and storage box identifier, as shown in FIG. 8. In this embodiment, the read information 370 consists of a designation identifier, a storage box identifier, a processed quantity, and read time and date. The designation identifier is an identifier for identifying a processing instruction, and is equivalent to the designation identifier contained in the corresponding production plan information 340. The storage box identifier is an identifier for identifying the corresponding one of the storage boxes 164, and is equivalent to the storage box identifier contained in the corresponding storage box information 350. The processed quantity is the number of parts to be stored in each one of the storage boxes 164. The read time and date indicates the time and date when the designation identifier, the storage box identifier, and the processed quantity were inputted by reading the bar code 149 in which the designation identifier, the storage box identifier, and the processed quantity have been recorded as readable information. The read information 370 is recorded when the bar code 149 is read from the corresponding one of the packaging cards 140.

Figure 9:
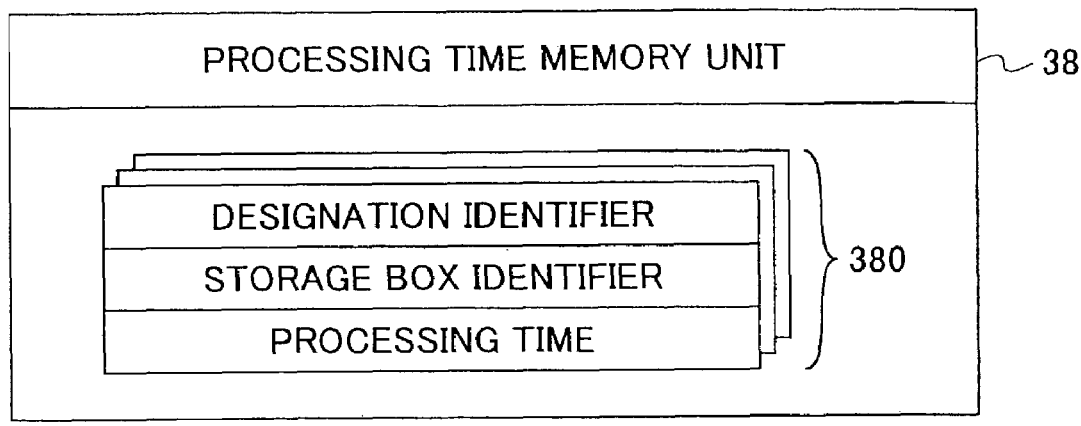
FIG. 9 illustrates the data recorded in a processing time memory unit.

In the processing time memory unit 38, processing time information 380 is recorded for each corresponding designation identifier and storage box identifier, as shown in FIG. 9. In this embodiment, the processing time information 380 consists of a designation identifier, a storage box identifier, and a processing time. The designation identifier is an identifier for identifying a processing instruction, and is equivalent to the designation identifier contained in the corresponding production plan information 340. The storage box identifier is an identifier for identifying the corresponding one of the storage boxes 164, and is equivalent to the storage box identifier contained in the corresponding storage box information 350. The processing time is the time required for processing the parts to be stored in the storage box 164. For first processing time information 380 with respect to a designation identifier, the processing time is determined by the difference between the read time and date contained in the corresponding read information 370 and the processing start time and date contained in the corresponding performance time information 360. For second and later processing time information 380 with respect to the same designation identifier, the processing time is determined by the difference between the read time and date of corresponding read information 370 and the read time and date of the previous read information 370. In this embodiment, the processing time information 380 is recorded when the corresponding read information 370 is recorded.

Figure 10:
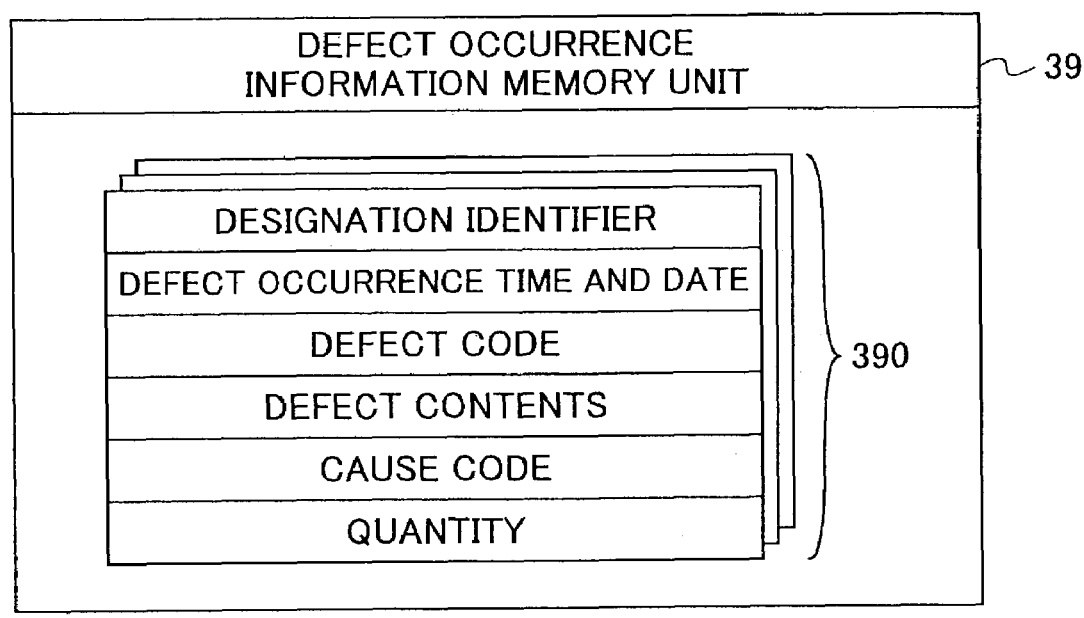
FIG. 10 illustrates the data recorded in a defect occurrence information memory unit.

In the defect occurrence information memory unit 39, defect occurrence information 390 is recorded for each corresponding designation identifier and defect occurrence time and date, as shown in FIG. 10. In this embodiment, the defect occurrence information 390 consists of a designation identifier, defect occurrence time and date, a defect code, defect details, a cause code, and the number of defective parts. The designation identifier is an identifier for identifying a processing instruction, and is equivalent to the designation identifier contained in the corresponding production plan information 340. The defect occurrence time and date indicate the time when a defect occurrence report is received. The defect code is a code that represents the defect details, and is recorded in association with the defect details in the memory unit (not shown) in advance. The cause code is a code that represents the cause of the defect. The number of defective parts indicates the number of parts from which the defect is detected. The number of defective parts reported in one defect occurrence report is recorded as the number of defective parts.

When a defect occurrence report is received, the designation identifier and the defect occurrence time and date are recorded in the defect occurrence information 390. After that, upon receipt of a defect details report, the defect code, the defect details, the cause code, and the number of defective 10, parts are recorded.

Figure 11:
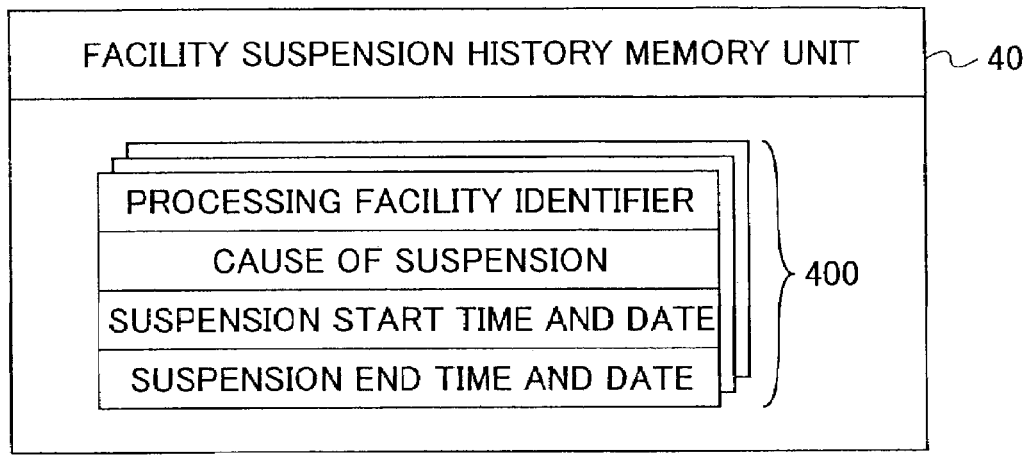
FIG. 11 illustrates the data recorded in a facility suspension history memory unit.

In the facility suspension history memory unit 40, facility suspension history information 400 is recorded for each facility suspension of each processing facility, as shown in FIG. 11. In this embodiment, the facility suspension history information 400 consists of a processing facility identifier, a cause of suspension, suspension start time and date, and suspension end time and date. The processing facility identifier is an identifier for identifying a processing facility, and is equivalent to the processing facility identifier contained in the corresponding production plan information 340.

The cause of suspension is the cause of the occurrence of the facility suspension. The suspension start time and date indicates the time and date when the facility suspension started. In a case where a facility suspension started during the parts processing, the suspension start time and date should be equal to the processing suspension start time and date, as the parts processing is actually suspended. The suspension end time and date indicates the time and date when the facility suspension ended. A facility suspension is caused by a fault or an end in the parts processing. In the case where the facility suspension was caused by a fault, the suspension end time and date should be the time and date when the facility was recovered. If the facility suspension were caused during the parts processing and the parts processing were resumed at the time of the recovery of the facility in the above case case, the suspension end time and date should be equal to the processing resumption time. In the case where the facility suspension was cause by an end in the parts processing, the suspension end time and date should be the time and date when the facility was reactivated. When a facility suspension occurs, the processing facility identifier, the cause of suspension, and the suspension start time and date, are set and recorded in the facility suspension history information 400. When the facility is recovered, the suspension end time and date are set and recorded.

Figure 12:
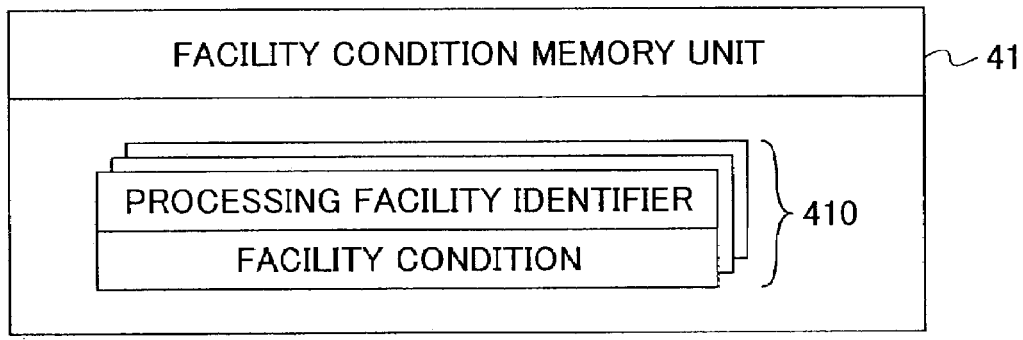
FIG. 12 illustrates the data recorded in a facility condition memory unit.

In the facility condition memory unit 41, facility condition information 410 is recorded for each processing facility, as shown in FIG. 12. In this embodiment, the facility condition information 410 consists of a processing facility identifier and a facility condition. The processing facility identifier is an identifier for identifying a processing facility, and is equivalent to the processing facility identifier contained in the corresponding production plan information 340. The facility condition indicates the operating condition of the processing facility. In the facility condition information 410, the current facility condition is recorded for each processing facility in advance of the parts processing of this embodiment. Every time the processing facility condition changes, the facility condition in the facility condition information 410 is updated.

Figure 13:
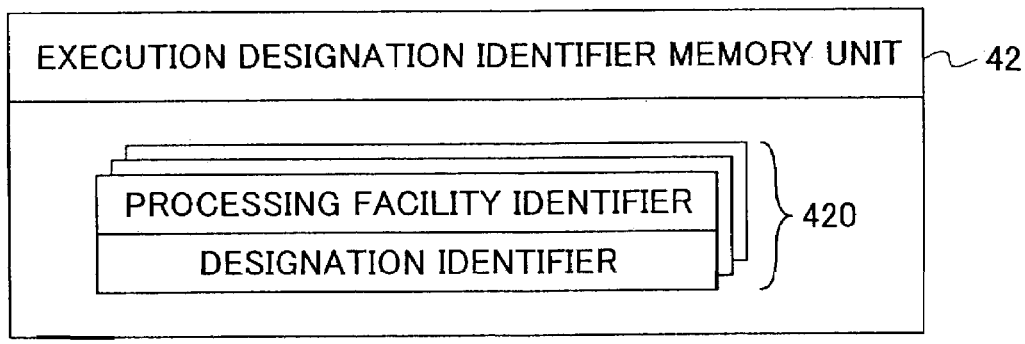
FIG. 13 illustrates the data recorded in an execution designation identifier memory unit.

In the execution designation identifier memory unit 42, execution designation identifier information 420 concerning a designated production plan is recorded for each processing facility, as shown in FIG. 13. In this embodiment, the execution designation identifier information 420 consists of a processing facility identifier, and a designation identifier. The processing facility identifier is an identifier for identifying a processing facility, and is equivalent to the processing facility identifier contained in the corresponding production plan information 340. The designation identifier is an identifier for the designated production plan, and is equivalent to the designation identifier contained in the corresponding production plan information 340. The execution designation identifier information 420 is recorded for the currently designated production plan, based on the production plan information 340.

Referring now to FIGS. 14 through 19, the procedures for performing the parts processing stage control with the control computer 31 in the above described system will be described below. In the following description, the procedures are divided into three operations: an operation to control the execution state of the parts processing (referring to FIGS. 14 through 17); an operation to issue the defect report 166 (referring to FIG. 18); and an operation to issue the facility operating condition report 167 (referring to FIG. 19).

The control computer 31 issues instructions sequentially in accordance with the order of processing instructions for each processing facility, so that parts processing can be carried out for the production plan having the production date of today, based on the production date, the processing facility identifier, and the processing order contained in the corresponding production plan information 340. With respect to the designated production plan, the control computer 31 stores the designation identifier of each processing facility in the execution designation identifier memory unit 42.

Referring first to FIGS. 14 through 17, the procedures for controlling the execution state of the parts processing in accordance with the designated production plan will be described. The control computer 31 carries out these procedures in accordance with the execution state controlling program.

Figure 14:
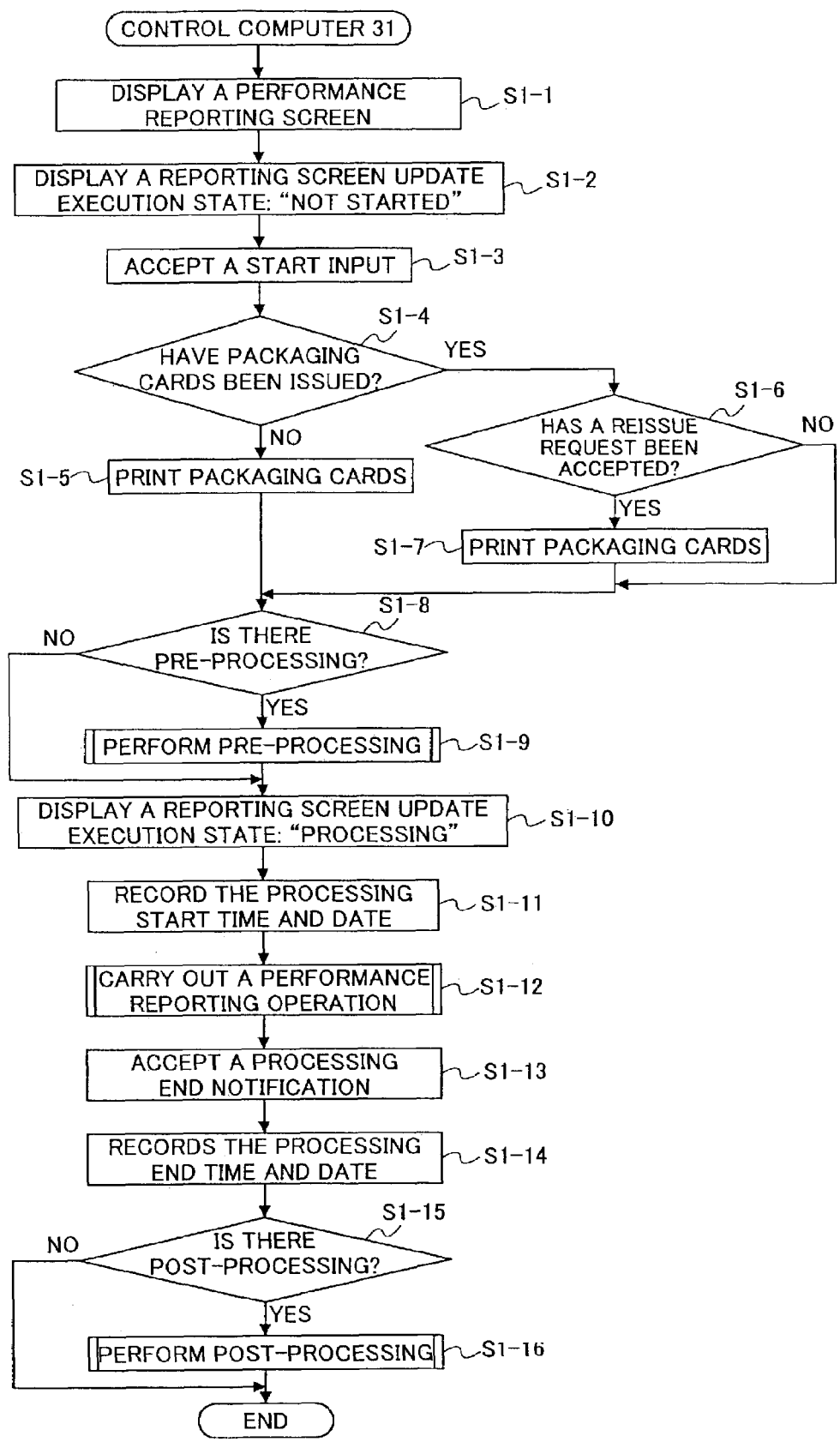
FIG. 14 illustrates a processing operation in accordance with the embodiment of the present invention.

As shown in FIG. 14, an operator who is to make a performance report first accesses the production control server 30 through the operation terminal 46, so that a performance reporting screen is displayed (S1-1). More specifically, using the operation terminal 46, the operator transmits an access request to the control computer 31 via the network 45. In response to this, the control computer 31 transmits log-on screen display data to the operation terminal 46, so that the log-on screen for the parts processing stage control is displayed.

Figure 20:
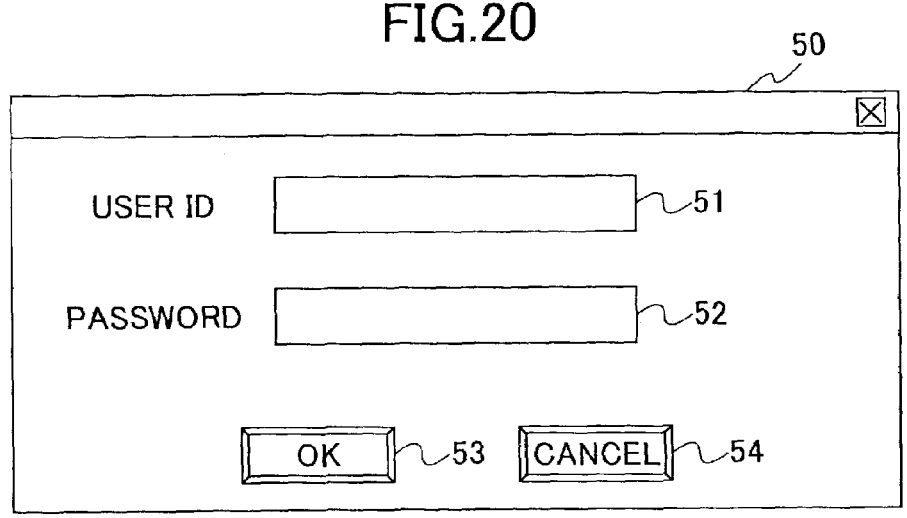
FIG. 20 illustrates a log-on screen outputted to the display unit of an operation terminal.

A display screen 50 shown in FIG. 20 is then displayed on the operation terminal 46, which has received the log-on screen display data. On this display screen 50, a user ID input box 51, a password input box 52, an OK button 53, and a cancel button 54, are displayed. The user ID and password of each operator are recorded in an authentication information memory unit (not shown) in advance. The OK button 53 is used for inputting and transmitting a user ID and a password to the control computer 31. The cancel button 54 is used for canceling a log-on request to the parts processing stage control. When a user ID and a password are inputted through the user ID input box 51 and the password input box 52, and the OK button 53 is clicked, the operation terminal 46 transmits the inputted user ID and password to the control computer 31. Upon receipt of the user ID and password, the control computer 31 compares the inputted user ID and password with the user IDs and passwords recorded in the authorization information memory unit. If there are a matching user ID and a matching password in the authentication information memory unit, the operator is allowed to have a log-on privilege to the parts processing stage control. The control computer 31 then transmits menu display data to the operation terminal 46, so that a menu select screen is displayed on the operation terminal 46.

Figure 21:
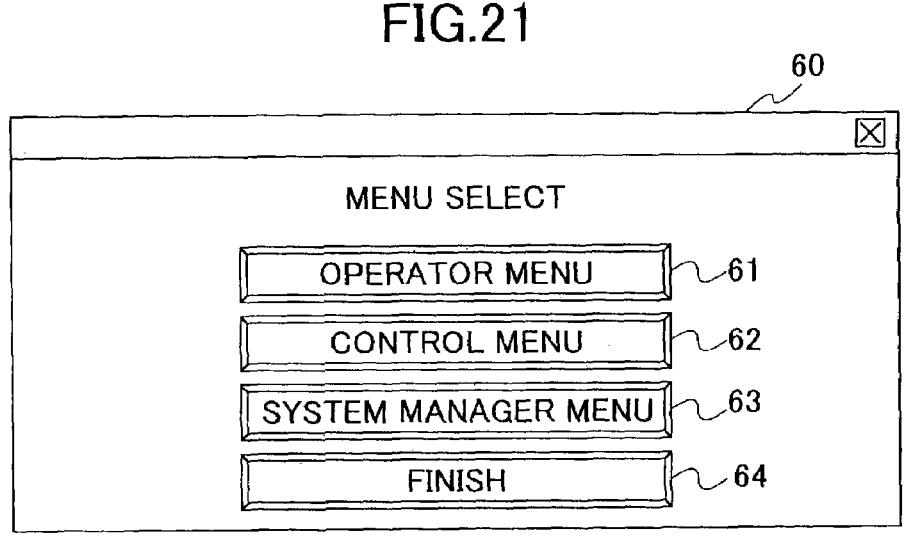
FIG. 21 illustrates a menu display screen outputted to the display unit of the operation terminal.

A display screen 60 shown in FIG. 21 is then displayed on the operation terminal 46, which has received the menu display data. On this display screen 60, an operator menu select button 61, a control menu select button 62, a system manager menu select button 63, and a finish button 64, are displayed. The operator menu select button 61 is used by an operator to send reports such as a performance report. The control menu select button 62 is used by the manager to produce screens such as a daily report screen that will be described later. The system manager menu select button 63 is used for controlling the system. The finish button 64 is used for terminating access to the control computer 31. Here, the operator clicks the operator menu select button 61 to make a performance report. By doing so, the operation terminal 46 transmits operator menu select data to the control computer 31. Upon receipt of the operator menu select data, the control computer 31 transmits facility select screen display data to the operation terminal 46, so that a facility select screen for selecting a processing facility is displayed on the operation terminal 46.

Figure 22:
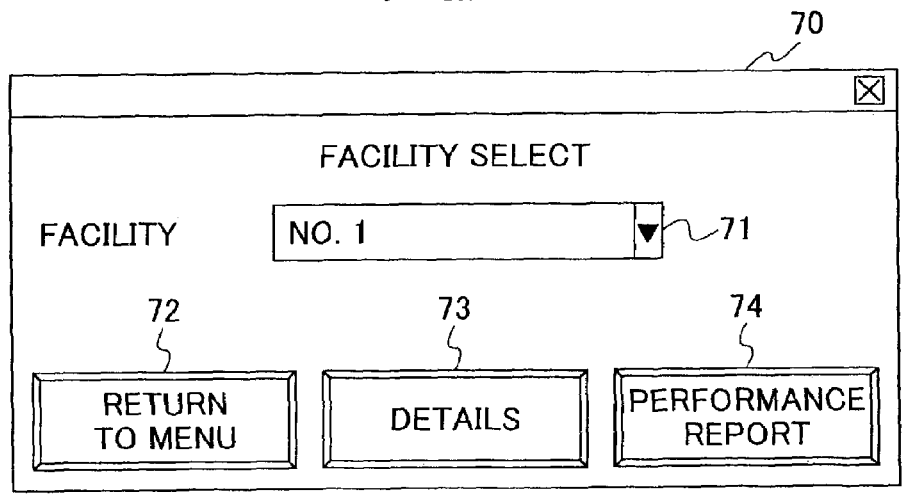
FIG. 22 illustrates a facility select screen outputted to the display unit of the operation terminal.

A display screen 70 shown in FIG. 22 is next displayed on the operation terminal 46, which has received the facility select screen display data. On this display screen 70, a facility select box 71, a return button 72, a detail button 73, and a performance reporting button 74, are displayed. The facility select box 71 is used for selecting a facility for making a performance report. The return button 72 is used for returning to the display screen 60. The detail button 73 is used for displaying the performance reporting screen that will be described later. Here, as a facility for carrying out parts processing in accordance with the processing instruction, "facility No. 1" is selected through the facility select box 71. When the performance reporting button 74 is clicked, the operation terminal 46 transmits performance reporting screen display request data to the control computer 31. Upon receipt of the data, the control computer 31 transmits performance reporting screen display data to the operation terminal 46, so that the performance reporting screen is displayed on the operation terminal 46.

A display screen 80 shown in FIG. 23 is then displayed on the operation terminal 46, which has received the performance reporting screen display data. On this display screen 80, a facility name indicator 81, a processing details indicator 82, an unread button 83, a facility condition indicator 90, an execution state indicator 91, execution time and date 92, and an OK button 93, are displayed. On this display screen 80, a designation identifier input box 94, a serial number input box 95, a quantity input box 96, an inputted designation identifier indicator 97, an inputted serial number indicator 98, an inputted quantity indicator 99, and an enter button 100, are also displayed. On this display screen 80, a detail button 101, a hold button 102, a defect solution button 103, a finish button 104, and a stop/turn-off button 105, are further displayed.

More specifically, the display screen 80 displays necessary information for making a performance report as to the designated production plan. The facility name indicator 81 shows the name of a facility selected through the facility select box 71 on the display screen 70. The processing details indicator 82 shows a parts number, a planned quantity, a produced quantity, the numbers of cards read/issued, a designation identifier, a planned date, and the next production plan. The parts number indicates the parts number of completed parts produced in accordance with the designated production plan. The number of parts to be produced indicates the planned quantity according to the designated production plan, and is set based on the planned quantity contained in the corresponding production plan information 340. The produced number indicates the number of parts on which the processing is completed among the parts to be produced in accordance with the designated production plan, and is set based on a value obtained by adding up the numbers of processed parts contained in the corresponding read information 370. The number of read card is set based on the numbers that have been read by the bar code reader 170 and inputted through the input boxes 94 through 96, as well as the number of pieces of the read information 370 corresponding to the currently designated production plan. The number of issued cards indicates the total number of issued packaging cards 140, and is set based on the number of pieces of the storage box information 350 having the designation identifier corresponding to the currently designated production plan. The designation identifier indicates the designation identifier attached to the designated production plan, and is set in accordance with the processing instruction issued through the schedule management operation. The planned date indicates the date on which the designated production plan was made, and is set based on the planned date contained in the corresponding production plan information 340. The next production plan indicates the parts number in accordance with a processing instruction to be issued after the designated production plan. In the next production plan, the parts number of products to be produced in a production plan to be carried out after the currently designated production plan is set in accordance with the processing order contained in the corresponding production plan information 340. The unread button 83 is used for checking whether any bar code 149 is left unread after the end of the processing.

The facility condition indicator 90 indicates the operating condition of the facility, and is set based on the facility condition contained in the corresponding facility condition information 410. Here, the facility condition indicator 90 displays "In Operation", as the facility is in operation and "Facility in Operation" is set as the facility condition in the facility condition information 410. The execution state indicator 91 indicates the execution state of the processing in accordance with the designated production plan, and is set based on the setting of each time and date in the corresponding performance time information 360. Here, the operation in accordance with the designated production plan has not been started, and therefore the performance time information 360 having the designation identifier designated through the schedule management operation has not been recorded yet. Accordingly, the execution state indicator 91 displays "Not Started". The execution time and date indicator 92 indicates the time and date when the execution state was changed to the current execution state that is indicated by the execution state indicator 91. The OK button 93 is used for inputting an operation report. A click on the OK button 93 may bring out different situations depending on the execution state of the processing displayed as the execution state indicator 91. More specifically, when the OK button 93 is clicked, an end report of the current execution state indicated by the execution state indicator 91 is made, and the processing moves onto the next state.

In a case where the packaging cards run out due to an excessive number of parts processed, or where the number of completed parts to be accommodated in one storage box 164 has not reached the storage capacity number, values are directly inputted into the input boxes 94 through 96. The designation identifier corresponding to the processing instruction is inputted in the designation identifier input box 94, based on the designation identifier printed on some other packaging card 140. A storage box identifier that is a serial number with respect to storage box identifiers that have already been inputted is inputted in the serial number input box 95. The number of parts stored in the corresponding one of the storage boxes 164 is inputted in the quantity input box 96. The enter button 100 is used for transmitting the information inputted through the input boxes 94 through 96 to the control computer 31.

Meanwhile, based on the information read from the bar code 149 printed on the corresponding packaging card 140, the designation identifier, the storage box identifier, and the quantity, are set in the indicators 97 through 99, respectively. Here, the information read from the bar code 149 is automatically transmitted to the control computer 31.

The detail button 101 is to be clicked to display a detail screen that will be described later. The hold button 102 is to be clicked to suspend and hold the parts processing in accordance with the designated production plan. The defect handling button 103 is to be clicked to display a defect handling screen that will be described later. The finish button 104 is to be clicked to finish the execution state indicated by the execution state indicator 91 and not to proceed to the next execution state (or to turn it off). The stop/turn-off button 105 is to be clicked to stop or turn off the corresponding facility.

As the operation in accordance with the designated production plan has not been started at this point, the control computer 31 issues such an instruction that the execution state indicator 91 should display "Not Started" (S1-2). More specifically, as the performance time information 360 having the designation identifier corresponding to the designated production plan is not recorded in the performance time memory unit 36, the control computer 31 determines that the designated operation has "not been started". In the case where the designated operation has "not been started", the OK button 93 is clicked to input a start request. When an operator clicks the OK button 93, the operation terminal 46 transmits start input data to the control computer 31. Upon receipt of the start input data, the control computer 31 accepts a start (S1-3).

The control computer 31 next determines from the storage box information 350 whether the packaging cards 140 have been issued (S1-4). More specifically, in a case where the storage box information 350 having the designation identifier corresponding to the designated production plan has already been set, the control computer 31 determines that the packaging cards 140 have been issued. In a case of a new processing instruction, the packaging cards 140 are issued for the first time at this point. In a case where the packaging cards 140 have been issued, a suspended operation is to be resumed. In this example, the designated production plan concerns a new processing instruction.

In a case where the packaging cards 140 have not been issued ("NO" in S1-4), the control computer 31 has the packaging cards 140 printed (S1-5). More specifically, the control computer 31 extracts the planned quantity out of the production plan information 340 having the same designation identifier as the designation identifier of the designated operation. The control computer 31 also extracts the storage capacity number out of the storage capacity information 320 having the same parts number as the parts number contained in the production plan information 340. The control computer 31 then divides the planned quantity by the storage capacity number to obtain the necessary number of storage boxes 164. The control computer 31 records the storage box information 350 in the storage box information memory unit 35. In the storage box information 350, the storage box identifiers of the necessary number of storage boxes 164 and the designation identifier are set. The control computer 31 then has the packaging cards 140 printed. On each of the packaging cards 140, the control computer 31 prints a bar code 149 in which the designation identifier, the storage box identifier, and the planned quantity are recorded as readable information that can be read by the bar code reader 170 as a reading means.

Here, the packaging cards 140 will be described. As described above, the packaging cards 140 are attached to the storage boxes 164 in which completed parts are to be stored. The number of packaging cards 140 to be issued is the same as the number of storage boxes 164 in which completed parts are to be stored. More specifically, the control computer 31 divides the planned quantity in the parts processing in accordance with the production plan designated by the designation identifier, by the storage capacity number of each one storage box 164, so as to obtain the necessary number of storage boxes 164. The control computer 31 then issues the corresponding number of the packaging cards 140 to the number of storage boxes 164.

The items printed on each of the packaging cards 140 will next be described. As shown in FIG. 26, a parts number 141, a quantity 142, a name 143, a section/step 144, a facility 145, a designation identifier 146, a planned date/issue number 147, and a bar code 149, are shown on each of the packaging cards 140. Further, a processing date/processor name 148 is written on each storage box 164 when the bar code 149 is read after the storing of completed parts into the storage box 164. In the example shown in FIG. 26, the parts number 141 is "A111", the quantity 142 is "24", the name 143 is "Development—", the section/step 144 is "M01", and the facility name 145 is "No. 1". Also, "A1201" is shown as the designation identifier 146, and "12/20/2001 25/78" is shown as the planned date/issue number 147. Here, the "24" of the quantity 142 indicates the number of completed parts that can be stored in one storage box 164, and is set based on the storage capacity number contained in the storage capacity information 320. The "25/78" shown as the issue number of the planned date/issue number 147 indicates a storage box identifier and the total number of storage box identifiers attached to the corresponding designation identifier. The storage box identifiers are serial numbers attached to one designation identifier. In this case, 78 storage box identifiers have been attached to the designation identifier, and the corresponding number of packaging cards 140 have been issued. The storage box identifier of "25" indicates that the packaging card 140 having this storage box identifier is the 25th card among the issued packaging cards 140. In the bar code 149, information including a designation identifier, a storage box identifier, and a planned quantity, is recorded.

On the other hand, in a case where the packaging cards 140 have already been issued ("YES" in S1-4), the control computer 31 instructs the operation terminal 46 to display a display screen (not shown) for reissuing the packaging cards 140. On this display screen, an operator inputs a reissue request for the packaging cards 140. When accepting the reissue request for the packaging cards 140 ("YES" in S1-6), the control computer 31 has the packaging cards 140 printed (S1-7).

Figure 15:
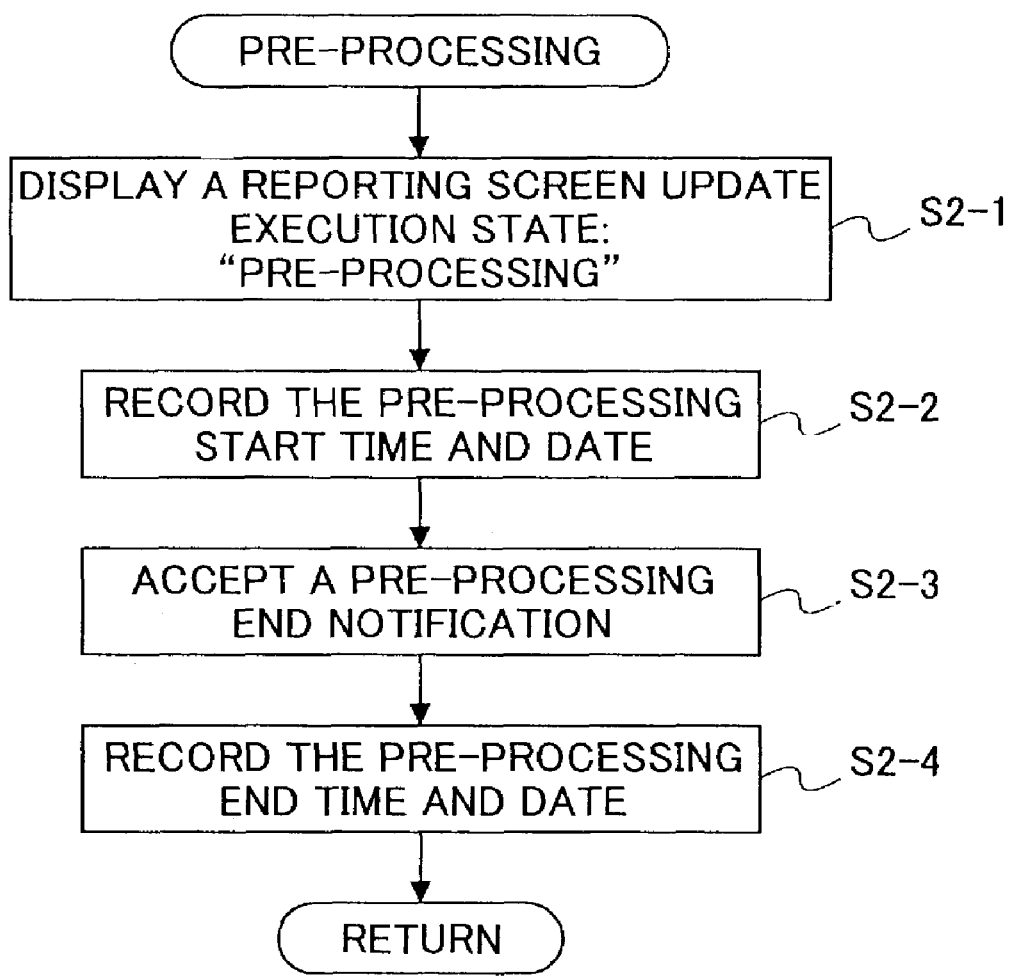
FIG. 15 illustrates a pre-processing operation in accordance with the embodiment of the present invention.

The control computer 31 next determines whether preprocessing is required, from the parts number and the processing information memory unit 33 (S1-8). If pre-processing is required ("YES" in S1-8), the control computer 31 performs the preprocessing (S1-9). Referring to FIG. 15, the preprocessing operation will be described below.

As shown in FIG. 15, the control computer 31 updates the display screen 80, and issues such an instruction that the execution state indicator 91 should display "Pre-Processing" (S2-1). More specifically, the control computer 31 determines that the designated operation is in the "Pre-Processing" step, as the performance time information 360 having the designation identifier corresponding to the designated production plan has not been recorded in the performance time memory unit 36. The control computer 31 then records the performance time information 360, in which a designation identifier and pre-processing start time and date are set, in the performance time memory unit 36 (S2-2).

Meanwhile, an operator carries out an operation corresponding to the pre-processing. When finishing the pre-processing, the operator inputs a pre-processing end notification. More specifically, the operator clicks the OK button 93 on the display screen 80. If the OK button 93 is clicked while the designated operation is in the "Pre-Processing" step, a pre-processing end notification is inputted into the control computer 31. After receiving the preprocessing end notification (S2-3), the control computer 31 sets the pre-processing end time and date in the performance time information 360 (S2-4).

The control computer 31 then updates the indicators on the display screen 80, and issues such an instruction that the execution state indicator 91 should display "Processing" (S1-10). After that, the control computer 31 records the processing start time and date (S1-11). More specifically, if there is the pre-processing, the control computer 31 sets the processing start time and date in the performance time information 360 in the above described manner. If there is no pre-processing, the control computer 31 records the performance time information 360 in the performance time memory unit 36. In the performance time information 360, a designation identifier and processing start time and date are set.

Figure 17:
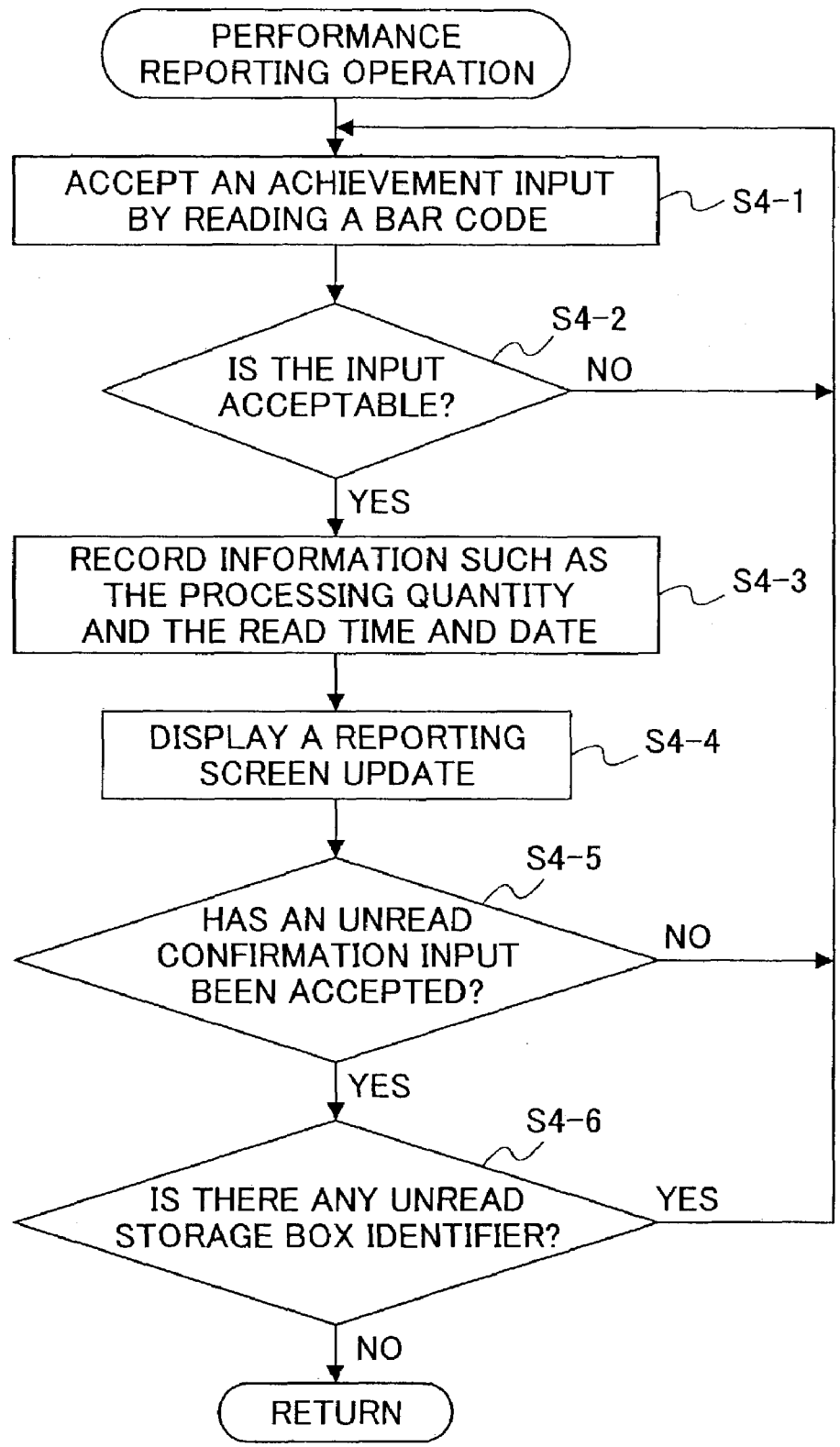
FIG. 17 illustrates a performance report inputting operation in accordance with the embodiment of the present invention.

Every time the parts processing is completed for the number of parts to be stored in one storage box 164 in the main processing step, an operator stores the completed parts in the storage box 164, and inputs a performance report of the parts processing. Meanwhile, receiving the performance report, the control computer 31 carries out a performance reporting operation (S1-12). Referring now to FIG. 17, the procedures for carrying out the performance reporting operation will be described below. The control computer 31 performs this operation in accordance with the performance reporting program.

Every time the parts processing is completed for the storage capacity number of parts specified in the storage capacity information 320, an operator stores the completed parts in the storage box 164. The operator then reads the bar code on the corresponding packaging card 140 with the bar code reader 170, and attaches the packaging card 140 to the storage box 164. The designation identifier, the storage box identifier, and the storage box quantity, which have been read from the bar code 149, are displayed by the inputted designation identifier indicator 97, the inputted serial number indicator 98, and the inputted quantity indicator 99 of the display screen 80.

In a case where the actual number of processed parts is greater than the planned quantity contained in the production plan information 340, the packaging cards 140 run out. Also, the number of completed parts to be stored in a storage box 164 might be smaller than the storage capacity number recorded as the bar code 149 on the packaging card 140. In either case, an operator inputs a designation identifier, a storage box identifier, and a quantity, through the input boxes 94 through 96, based on the information printed on each packaging card 140 issued for the designated operation. More specifically, a designation identifier is inputted in the designation identifier input box 94, based on the designation identifier 146 shown on the packaging card 140. The next serial number of the storage box identifier indicated by the planned date/issue number 147 that has been read in advance from the bar code 149 on the packaging card 140 is inputted in the serial number input box 95. The number of completed parts stored in the storage box 164 is inputted in the quantity input box 96. In this manner, the achievement for each storage box 164 is inputted into the control computer 31 by reading the bar code 149 of each packaging card 140 or inputting information through the input boxes 94 through 96. As shown in FIG. 17, the control computer 31 accepts this achievement input using the information such as the bar code 149 (S4-1).

The control computer 31 next checks the contents of the achievement input (S4-2). More specifically, the control computer 31 compares the designation identifier of the achievement input with the designation identifier of the designated production plan that has been stored in the execution designation identifier memory unit 42 through the schedule management operation. The control computer 31 also compares the storage box identifier of the achievement input with the storage box identifier that is extracted from the read information 370 based on the above designation identifier. If the designation identifier of the achievement input is the same as the designation identifier of the designated production plan, but the storage box identifier of the achievement input is not the same as the storage box identifier extracted from the read information memory unit 37, the control computer 31 determines that the contents of the achievement input are acceptable. If the contents of the achievement input are not acceptable ("NO" in S4-2), the control computer 31 instructs the operation terminal 46 to display an alert to that effect. In response to the alert, the operator again carries out achievement input through operations such as reading the bar code 149 printed on the packaging card 140. On the other hand, if the contents of the achievement input are acceptable ("YES" in S4-2), the control computer 31 records the read information 370 in the read information memory unit 37 (S4-3). In the read information 370, the designation identifier of the achievement input, the storage box identifier, the processed quantity, and the read time and date are set.

Next, the control computer 31 calculates the processing time required for each storage box 164, and records the processing time information 380. More specifically, as for the first storage box 164 in the production plan designated by the designation identifier, the control computer 31 calculates the processing time as the period of time between the processing start time and date contained in the processing time information 380 and the read time and date contained in the read information 370. The control computer 31 then records the processing time information 380, in which the calculated processing time is set, in the processing time memory unit 38, along with the same designation identifier and storage box identifier as the designation identifier and storage box identifier to be recorded in the read information memory unit 37. As for each of the second and later storage boxes 164 in the production plan designated by the designation identifier, the control computer 31 calculates the processing time as the period of time between the read time and date contained in the read information 370 that has just been recorded, and the read time and date to be recorded in the read information 370 this time. The control computer 31 then records the processing time information in the same manner as in the case of the first storage box 164.

Based on the read information 370, the control computer 31 next updates the number of parts produced and the numbers of cards read/issued on the display screen 80 (S4-4). In the read information 370, information such as the number of produced parts that has been read with the bar code reader 170 and inputted through the input boxes 94 through 96 is recorded. More specifically, the control computer 31 adds the number of produced parts contained in the read information 370 that is recorded this time to the production number indicated by the processing details indicator 82, and also adds "1" to the number of read cards indicated by the processing details indicator 82.

If the parts processing of the designated production plan has not been completed, the parts processing is continued. The operator further carries out the storing of the storage capacity number of parts into each one storage box 164, and performs achievement input by reading the bar code 149 on each storage box 164. In this case, the operator does not click the unread button 83. Accordingly, the control computer 31 does not receive an unread confirmation input through the unread button 83 ("NO" in S4-5), and repeats steps S4-1 through S4-5.

When the parts processing of the designated production plan is completed, the operator clicks the unread button 83. By doing so, a completion report is inputted through an unread confirmation input that shows whether there are unread storage box identifiers as to the packaging cards 140 issued in accordance with the instruction identified with the designation identifier. In a case of receiving the unread confirmation input ("YES" in S4-5), the control computer 31 determines whether there are unread storage box identifiers (S4-6). More specifically, the control computer 31 compares the designation identifier and storage box identifiers contained in the corresponding storage box information 350 with the designation identifier and storage box identifiers contained in the corresponding read information 370. The control computer 31 then determines if any of the storage box identifiers contained in the storage box information 350 having the designation identifier corresponding to the designated production plan is not included in the storage box identifiers contained in the read information 370. If the storage box information 350 having the designation identifier corresponding to the designated production plan contains one or more storage box identifiers that are not included in the storage box identifiers contained in the read information 370, the control computer 31 determines that there are one or more unread storage box identifiers.

If there are one or more unread storage box identifiers ("YES" in S4-6), the control computer 31 outputs an alert to that effect, and returns to step S4-1. In this case, the operator again carries out the read operation of reading the bar code 149 on each of the packaging cards 140. The control computer 31 then carries out steps S4-1 through S4-6. On the other hand, if there are no unread storage box identifiers ("NO" in step S4-6), the control computer 31 finishes the operation corresponding to the performance report of the parts processing.

When the operator clicks the detail button 101 on the display screen 80, the operation terminal 46 transmits a details display request to the control computer 31. Receiving this request, the control computer 31 transmits details display screen data to the operation terminal 46, so that a details display screen is displayed on the operation terminal 46.

A display screen 110 shown in FIG. 24 is then displayed on the operation terminal 46, which has received the details display screen data. On this display screen 110, a facility name indicator 111, a display date input box 112, an achievement indicator 113, designation boxes 114, an order input box 115, an enter button 116, and a performance reporting button 117, are displayed. More specifically, the facility name indicator 111 shows the name of the facility selected through the facility select box 71 on the display screen 70.

Through the display date input box 112, the operator designates until which day the achievements in the designated production plan will be displayed by the achievement display 113. If the operator does not designate a specific date at this point, all the achievements in the production plan since the set date will be displayed. The achievement indicator 113 shows the operation achievement by each designation identifier. In the achievement indicator 113, an order, a date, a parts number, a condition, a planned quantity, a produced quantity (the number of actually produced parts, the number of shipped parts, the number of parts that can be shipped), a defect quantity (the number of occurrences, the number of solved defects, and the number of defects to be solved), and a designation identifier (not shown), are displayed. The order indicates the order of processing instructions, and is set based on the processing order contained in the corresponding production plan information 340. The date is set based on the planned date contained in the same production plan information 340. The parts number is the parts number of parts completed in accordance with the processing instructions, and is set based on the parts number contained in the production plan information 340. The condition indicates the execution state, and is set based on the setting condition of each time and date extracted from the performance time information 360 according to each designation identifier, as well as on the hold condition stored in a memory unit (not shown). The planned quantity is set based on the planned quantity contained in the same production plan information 340. The number of actually produced parts in the produced quantity is set as the value obtained by adding up the processed quantity extracted from the read information 370 according to each designation identifier. The number of shipped parts in the produced quantity indicates the number of parts that have been shipped out, and is set based on the number of shipped parts that has been inputted through the operation terminal 46 at the time of shipping. The number of parts to be shipped in the produced quantity indicates the number of parts that can be shipped out, and is set based on the difference between the number of actually produced parts and the number of shipped parts. The number of occurrences in the defect quantity indicates the number of parts from which defect occurrences have been detected, and is set as the value obtained by adding up the number of defective parts extracted from the defect occurrence information 390 according to each designation identifier. The number of solved defects in the defect quantity indicates the number of parts that have been fixed among the parts from which defect occurrences have been detected, and is set based on the number of solved defects that has been inputted through the operation terminal 46. The number of defects to be solved in the defect quantity indicates the number of parts that have not been fixed among the parts from which defect occurrences have been detected, and is set based on the difference between the number of occurrences and the number of solved defects.

Each production plan displayed by the achievement indicator 113 is determined through selection of the order. After a production plan is selected, one item is selected from the designation boxes 114, so that an operation in accordance with the selected production plan is performed. The designation boxes 114 include an item to be selected in a case of returning the execution state to the previous state, an item to be selected in a case of restoring a suspended instruction, an item to be selected in a case of selecting a production plan to be executed next, and an item to be selected in a case of making a defect report, in this order from the top. In the case of restoring a suspended instruction, the order indicated by the achievement indicator 113 is inputted into the order input box 115, so that the control computer 31 plans to restart a suspended production plan after the current production plan. At this point, if the enter button 116 is clicked after the item corresponding to a selected production plan is selected from the designation boxes 114, the control computer 31 performs an operation in accordance with the item selected from the designation boxes 114 for the selected production plan. The performance reporting button 117 is to be clicked to display the performance reporting screen (i.e., the display screen 80).

Meanwhile, when the parts processing is finished, the operator inputs a processing end notification through the operation terminal 46. More specifically, the operator clicks the OK button 93 on the display screen 80. If the OK button 93 is clicked while the designated operation is in the "Processing" step, the processing end notification is inputted into the control computer 31. Accepting this processing end notification (S1-13), the control computer 31 sets the processing time and date in the corresponding performance time information 360 (S114).

The control computer 31 then searches the processing information memory unit 33 based on the parts number, and determines whether there is post-processing (S1-15). If there is post-processing ("YES" in S1-15), the control computer 31 carries out the post-processing (S1-16). This post-processing operation will be described below, with reference to FIG. 16.

Figure 16:
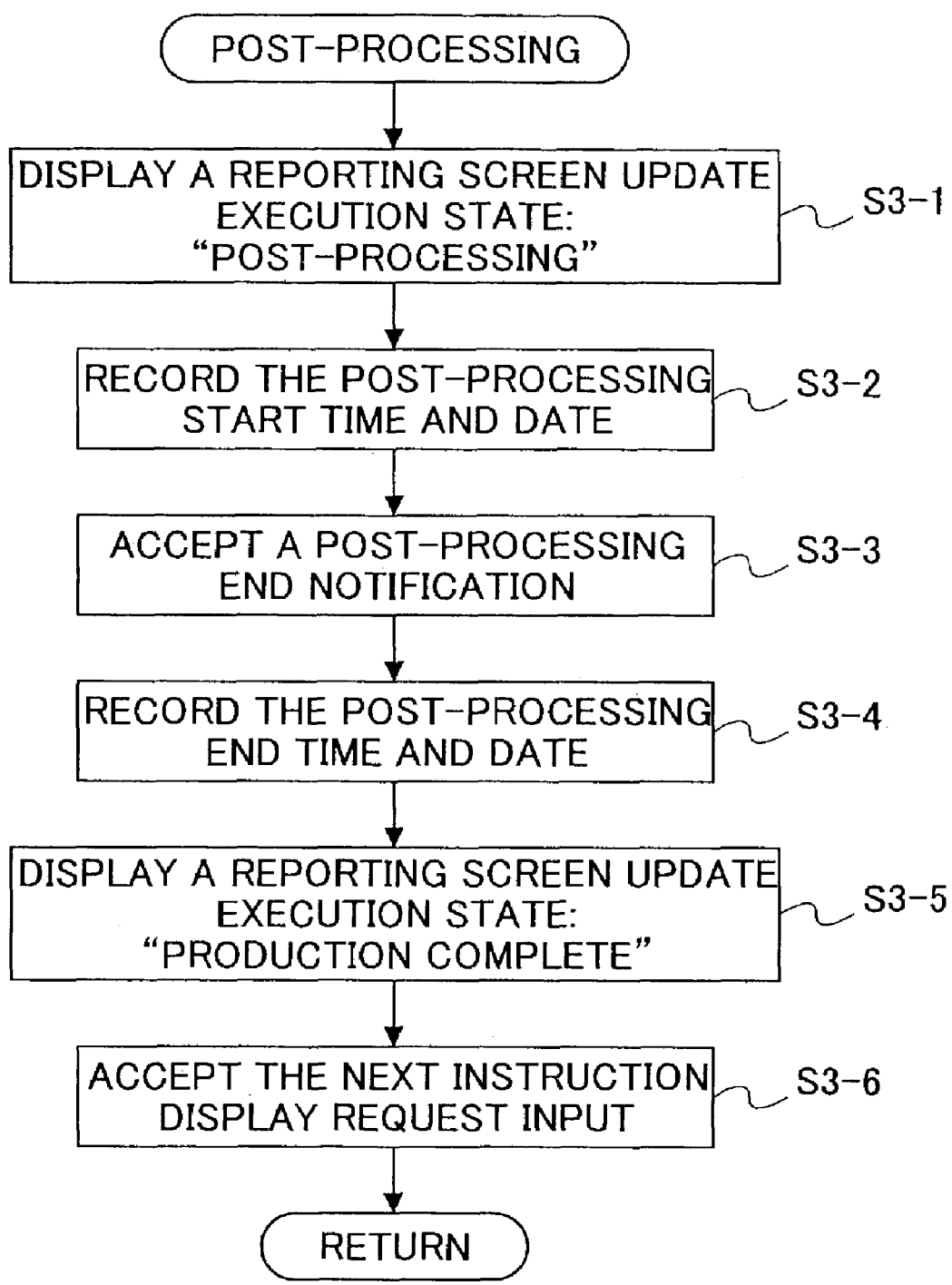
FIG. 16 illustrates a post-processing operation in accordance with the embodiment of the present invention.

As shown in FIG. 16, the control computer 31 issues such an instruction that the execution state indicator 91 of the display screen 80 should display "Post-Processing" (S3-1). The control computer 31 then sets the post-processing start time and date in the corresponding performance time information 360 (S3-2).

Meanwhile, the operator carries out an operation corresponding to the post-processing operation. When the post-processing operation is completed, the operator inputs a post-processing end notification through the operation terminal 46. More specifically, the operator clicks the OK button 93 on the display screen 80. If the OK button 93 is clicked while the designated operation is in the "Post-Processing" step, the post-processing end notification is inputted into the control computer 31. Accepting this post-processing end notification (S33), the control computer 31 sets the post-processing end time and date in the corresponding performance time information 360 (S3-4). The control computer 31 then issues such an instruction that the execution state indicator 91 of the display screen 80 should display "Production Complete" (S3-5).

If the OK button 93 is clicked while the designated operation is in the state of "Production Complete", a display request is inputted into the control computer 31, so that the display screen 80 of the next instruction that is indicated as the next production plan by the processing contents indicator 82 is displayed. When the operator clicks the OK button 93 in such a situation, the control computer 31 accepts the display request for the next instruction (S3-6). The control computer 31 then finishes the operation according to the processing instructions identified with the designation identifier indicated by the processing contents indicator 82.

If there is no pre-processing ("NO" in S1-8), the control computer 31 does not carry out the pre-processing operation, and moves on to step S1-10. If there is no post-processing ("NO" in S1-15), the control computer 31 does not carry out the post-processing operation, and finishes the entire operation.

Figure 18:
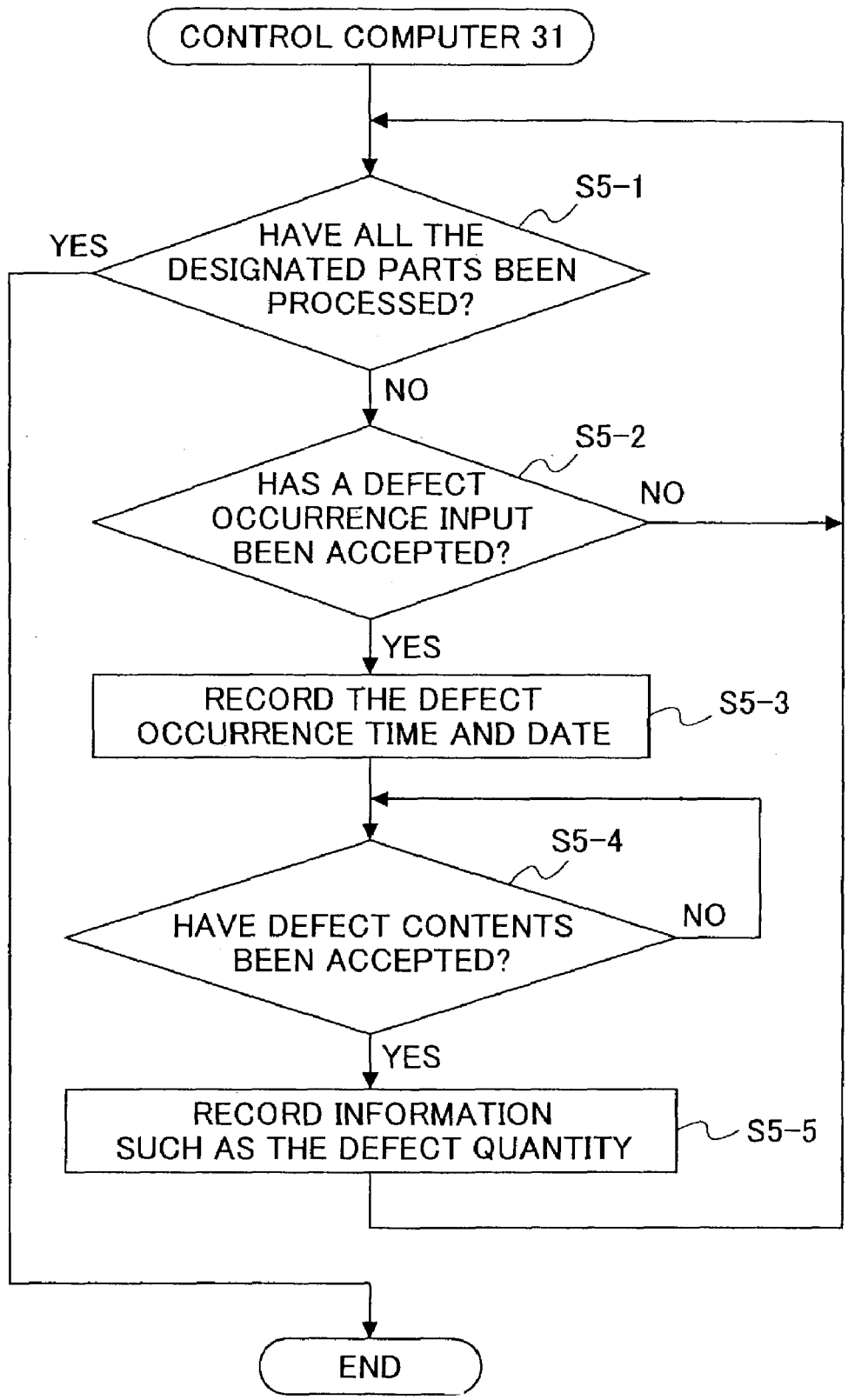
FIG. 18 illustrates a defect reporting operation in accordance with the embodiment of the present invention.

Referring now to FIG. 18, an operation to be performed in response to the defect report 166 will be described. The control computer 31 performs this operation in accordance with the defect reporting program.

As shown in FIG. 18, the control computer 31 repeats this operation until the parts processing in accordance with the current production plan identified with the designation identifier is completed (i.e., until the result of step S5-1 becomes "YES").

A report of a defect occurrence is made by clicking the defect handling button 103 on the display screen 80. When the defect handling button 103 is clicked, the operation terminal 46 transmits defect occurrence data to the control computer 31. Alternatively, a report of a defect occurrence can be made by selecting the item for making a defect report from the designation boxes 114 and then clicking the performance reporting button 117 on the display screen 110. In this case, the operation terminal 46 also transmits the defect occurrence data to the control computer 31. The control computer 31 then provides a defect reporting screen as an input means for making defect occurrence reports.

Receiving the defect occurrence data ("YES" in S5-2), the control computer 31 records the defect occurrence information 390 in the defect occurrence information memory unit 39 (S5-3). In the defect occurrence information 390, the designation identifier and the present time and date as the defect occurrence time and date are set. The control computer 31 then transmits defect reporting screen display data to the operation terminal 46, so that the defect reporting screen as an input means for inputting the contents of each defect is displayed on the operation terminal 46.

A display screen 130 shown in FIG. 25 is then displayed on the operation terminal 46, which has received the defect reporting screen display data. On this display screen 130, a facility name indicator 131, a designation identifier input box 132, a parts number input box 133, a quantity input box 134, a defect code input box 135, a cause code input box 136, a performance reporting button 137, a detail button 138, and an enter button 139, are displayed.

The designation identifier of the production plan selected in the achievement indicator 113 is set in the designation identifier input box 132. The parts number of the selected production plan is set in the parts number input box 133, based on the parts number contained in the corresponding production plan information 340. The number of parts from which defect occurrences have been detected is inputted in the quantity input box 134. Each defect code that indicates the contents of a defect is inputted in the defect code input box 135. Each cause code that indicates the cause of a defect is inputted in the cause code input box 136. The performance reporting button 137 is to be clicked to display the performance reporting screen (i.e., the display screen 80). The detail button 138 is to be clicked to display the details screen (i.e., the display screen 110). The enter button 139 is to be clicked to register the contents inputted through the display screen 130.

After all the information is set in the input boxes 132 through 136, the enter button 139 is clicked. The operation terminal 46 then transmits defect contents data that includes a designation identifier, a parts number, a quantity, a defect code, and a cause code, to the control computer 31.

Accepting the defect contents data ("YES" in S5-4), the control computer 31 records information such as the number of defects (S5-5). More specifically, based on the quantity, the defect code, and the cause code contained in the defect contents data, the control computer 31 sets each corresponding item in the defect occurrence information 390. Based on the defect code, the control computer 31 further records the defect contents that have been associated with the defect code and recorded in a defect code information memory unit (not shown) in advance, in the defect occurrence information 390. The control computer 31 then returns to step S5-1.

In this manner, one set of defect occurrence information 390 with respect to the defect report 166 is recorded. Every time receiving a defect occurrence notification, the control computer 31 carries out steps S5-3 through S5-5 to record the defect occurrence information 390.

Figure 19:
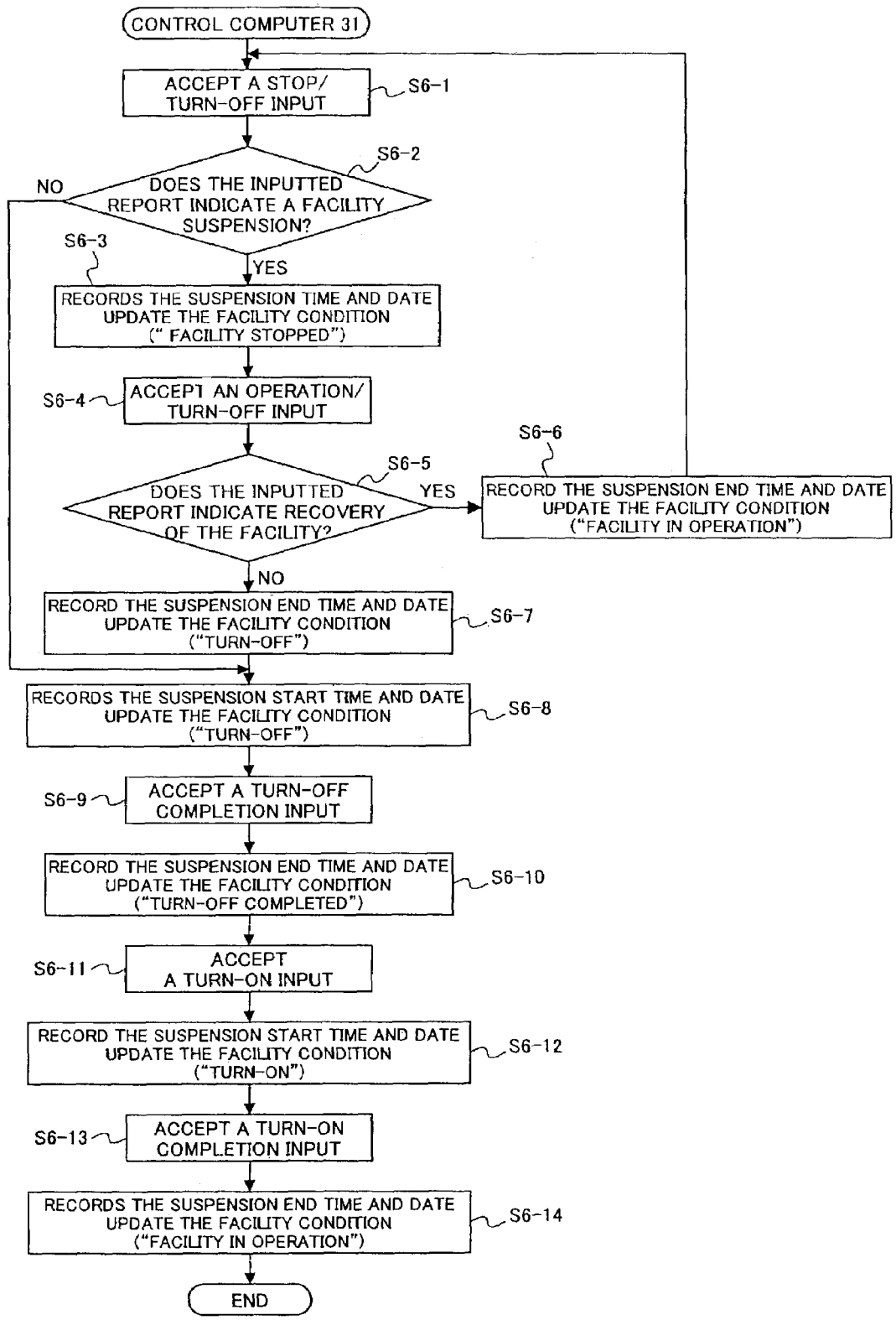
FIG. 19 illustrates a facility condition reporting operation in accordance with the embodiment of the present invention.

Referring now to FIG. 19, an operation corresponding to the facility operating condition report 167 will be described. The control computer 31 carries out this operation in accordance with the facility operation reporting program.

To switch off a facility, an operator clicks the stop/turn-off button 105 on the display screen 80. The operation terminal 46 then transmits stop/off input data to the control computer 31. Receiving the stop/off input data, the control computer 31 accepts a stop/off input (S6-1). The control computer 31 then transmits facility stop/off reporting screen display data to the operation terminal 46, so that a facility stop/off reporting screen is displayed on the operation terminal 46.

A facility stop/off reporting display screen (not shown) is then displayed on the operation terminal 46, which has received the facility stop/off reporting screen display data. Other than a report of "Facility Stopped" or "Facility Off", the cause of suspension and the processing facility identifier are inputted through this display screen. After the input is performed on this display screen, the inputted information is transmitted to the control computer 31, which in turn accepts the information. If the inputted report indicates "Facility Stopped" ("YES" in S6-2), the control computer 31 records information such as the suspension start time and date, and updates the facility condition (S6-3). More specifically, the control computer 31 records the facility suspension history information 400 in the facility suspension history memory unit 40. In the facility suspension history information 400, a processing facility identifier, the cause of suspension, and suspension start time and date, are set based on the inputted processing facility identifier, the cause of suspension, and the present time and date. The control computer 31 also searches for the corresponding facility condition information 410 based on the inputted processing facility identifier, and sets "Facility Stopped" as the facility condition in the corresponding processing facility condition information 410. The control computer 31 then changes the stop/turn-off button 105 on the display screen 80 to an operation/turn-off button for operating or switching off the facility, thereby updating the display screen 80. Accordingly, the operation/turn-off button is displayed instead of the stop/turn-off button 105 on the display screen 80. When this operation/turn-off button is clicked, an operation/turn-off request is inputted.

Meanwhile, the operator clicks the operation/turn-off button when the facility is restored or the day's processing is completed. The operation terminal 46 then transmits operation/turnoff input data to the control computer 31. Upon receipt of the operation/turn-off input data, the control computer 31 accepts an operation/turn-off input (S6-4). The control computer 31 then transmits facility operation/turn-off recording screen display data to the operation terminal 46, so that a facility operation/turn-off reporting screen is displayed on the operation terminal 46.

A display screen (not shown) for facility operation/turn-off reports is then displayed on the operation terminal 46, which has received the facility operation/turn-off reporting screen display data. Other than a report of "Facility Restored" or "Today's Operation Completed", the processing facility identifier is inputted through this display screen. After those items are inputted through the display screen, the inputted information is transmitted to the control computer 31, which in turn accepts the information. If the inputted report is a report of "Facility Restored" ("YES" in S6-5), the control computer 31 records the suspension end time and date, and updates the facility condition to "Facility in Operation" (S6-6). More specifically, the control computer 31 searches for the corresponding facility suspension history information 400 having no suspension end time and date set therein, based on the inputted processing facility identifier. The control computer 31 then sets the present time and date as the suspension end time and date in the corresponding facility suspension history information 400. The control computer 31 also searches for the corresponding facility condition information 410, and sets "Facility in Operation" as the facility condition in the corresponding facility condition information 410.

On the other hand, if the inputted report is "Today's Operation Completed" ("NO" in S6-5), the control computer 31 records the suspension end time and date, and updates the facility state to "Turn-Off" (S6-7). More specifically, the control computer 31 searches for the corresponding facility suspension history information 400 having no suspension end time and date set therein, based on the inputted processing facility identifier. The control computer 31 then sets the suspension end time and date as the present time and date in the corresponding facility suspension history information 400. The control computer 31 further searches for the corresponding facility condition information 410 based on the inputted processing facility identifier, and sets "Turn-Off" as the facility condition in the corresponding facility condition information 410.

The control computer 31 then records information such as the suspension start time and date, and updates the facility condition (S6-8). More specifically, the control computer 31 records the facility suspension history information 400 in the facility suspension history memory unit 40. In the facility suspension history information 400, the processing facility identifier is set as the processing identifier, the "Turn-Off" state is set as the cause of suspension, and the present time and date are set as the suspension start time and date. The control computer 31 also searches for the corresponding facility condition information 410 based on the processing facility identifier, and sets "Turn-Off" as the state condition in the corresponding facility condition information 410. The control computer 31 then changes the operation/turn-off button on the display screen 80 to a turn-off completing button used for reporting a turn-off of the facility. Thus, the display screen 80 is updated. When this turn-off completing button is clicked, a "Turn-Off Completion" notification is inputted.

When an operator clicks the turn-off completing button, the operation terminal 46 transmits turn-off completion data to the control computer 31. Receiving the turn-off completion data, the control computer 31 accepts a turn-off completion input (S6-9). The control computer 31 then records information such as the suspension start time and date, and updates the facility state to "Turn-Off Completed" (S6-10). More specifically, the control computer 31 searches for the corresponding facility suspension history information 400 having no suspension end time and date recorded therein, based on the processing facility identifier. The control computer 31 then sets the present time and date as the suspension end time and date in the corresponding facility suspension history information 400. The control computer 31 also searches for the corresponding facility condition information 410 based on the processing facility identifier, and sets "Turn-Off Completed" as the facility condition in the corresponding facility condition information 410. The control computer 31 then changes the turn-off completing button on the display screen 80 to a turn-on button used for reporting a turn-on of the facility. Thus, the display screen 80 is updated. When the turn-on button is clicked, a "Turn-On" notification is inputted.

When the processing facility that has been turned off in the above manner is to be again turned on, an operator clicks the turn-on button on the display screen 80. When the turn-on button is clicked, the operation terminal 46 transmits turn-on data to the control computer 31. Receiving the turn-on data, the control computer 31 accepts a turn-on input (S6-11). The control computer 31 then records the suspension start time and date, and updates the facility condition to "Turn-On" (S6-12). More specifically, the control computer 31 records the corresponding facility suspension history information 400 in the facility suspension history memory unit 40. In the facility suspension history information 400, the processing facility identifier is set as the processing identifier, "Turn-On" is set as the cause of suspension, and the present time and date are set as the suspension start time and date. The control computer 31 also searches for the corresponding facility condition information 410 based on the processing facility identifier, and sets "Turn-On" as the facility condition in the facility condition information 410. The control computer 31 then changes the turn-on button on the display screen 80 to a turn-on completing button used for reporting a turn-on of the facility. Thus, the display screen 80 is updated. When this turn-on completing button is clicked, a "turn-on completion" notification is inputted.

When an operator clicks the turn-on completing button, the operation terminal 46 transmits turn-on completion data to the control computer 31. Receiving the turn-on completion data, the control computer 31 accepts a turn-on completion input (S6-13). The control computer 31 then records information such as the suspension start time and date, and updates the facility condition to "Turn-On Completed" (S6-14). More specifically, the control computer 31 searches for the corresponding facility suspension history information 400 having no suspension end time and date, based on the processing facility identifier. The control computer 31 then sets the present time and date as the suspension end time and date in the facility suspension history information 400. The control computer 31 also searches for the corresponding facility condition information 410 based on the processing facility identifier, and sets "Facility in Operation" as the facility condition in the facility condition information 410. The control computer 31 then changes the turn-on completing button on the display screen 80 to the stop/turn-off button 105 used for reporting a stop or turn-off of the facility. Thus, the display screen 80 is updated, and the stop/turn-off button 105 is again displayed on the display screen 80. In this manner, the control computer 31 carries out the operation corresponding to the facility operating condition report 167 since a stop/turn-off input is accepted until the processing facility is put back into operation. The control computer 31 then finishes the operation.

If the inputted report is "today's processing completed" ("NO" in S6-2), the control computer 31 moves on to step S6-8. The control computer 31 then carries out steps S6-8 through S6-10 to control the operating condition of the processing facility until a turn-off of the facility is completed. In a case where the processing facility is to be put back into operation, the control computer 31 carries out steps S6-11 through S6-14 to perform the operation until the processing facility starts operating again. The control computer 31 then finishes the operation corresponding to the facility operating condition report 167.

In the manner described above, the setup start report 162, the processing start report 163, the processing end report 168, the parts completion report 165 as a performance report, the defect report 166, and the facility operating condition report 167, are made. The control computer 31 then produces the daily report information 169 that contains the production progress, quality, and productivity, based on the information that has been recorded in the memory units 36 through 41 in accordance with the reports 162, 163, 165, 166, 167, and 168.

Meanwhile, when a manager clicks the control menu select button 62 on the display screen 60 of the control terminal 47, a control display screen (not shown) is displayed. When a daily report producing request is inputted through this display screen, the operation terminal 46 transmits daily report producing request data to the control computer 31. Upon receipt of the daily report producing request data, the control computer 31 produces the daily report information 169, and transmits daily report screen display data to the control terminal 47, so that the daily report screen is displayed on the control terminal 47.

A display screen 150 shown in FIG. 27 is then displayed on the control terminal 47, which has received the daily report screen display data. On this display screen 150, a production time and date indicator 151, a production achievement indicator 152, a quality indicator 153, a processing indicator 154, a setup indicator 155, and a facility suspension indicator 156, are displayed.

The production achievement indicator 152 indicates a parts number, a designation identifier, a facility name, a condition, a planned quantity, a completion quantity, an excess or shortage quantity, a stocked quantity, a total excess or shortage quantity, a defect quantity, a planned yield, and an achieved yield. The production achievement indicator 152 indicates the details of a delay in processing, including a parts number, a designation identifier, a facility name, a condition, a planned quantity, a completion quantity, an excess or shortage quantity, a stocked quantity, a total excess or shortage quantity, a defect quantity, a planned yield, and an achieved yield. Here, the parts number, the designation identifier, the facility name and the planned quantity are set based on the parts number, the designation identifier, the processing facility identifier, and the planned quantity contained in the corresponding production plan information 340. The condition is set based on the setting of each time and date contained in the corresponding performance time information 360. The completion quantity is set by adding up the processing quantity contained in the read information 370 of each designation identifier. The excess or shortage quantity is the difference between the planned quantity and the completion quantity. The stocked quantity is set based on the stocked quantity recorded in a stock information memory unit (not shown). The total excess or shortage quantity is set by calculating the total of excess or shortage quantity up to date. The defect quantity is set by adding up the defect quantity contained in the defect occurrence information 390 of each designation identifier. The planned yield indicates a planned production yield as a percentage, and is set based on the planned yield recorded in a memory unit (not shown). The achieved yield indicates an actual production yield as a percentage, and is set based on the planned quantity and the defect quantity.

The quality indicator 153 indicates a parts number, a facility name, defect contents, a defect quantity, an unsolved defect quantity, a monthly total defect quantity, a planned yield, and an achieved yield. Here, the parts number and the facility name are based on the parts number and the processing facility identifier contained in the corresponding production plan information 340. The defect contents and the defect quantity are set based on the defect contents and the defect quantity contained in the corresponding defect occurrence information 390. The unsolved defect quantity indicates the number of defects which have not been solved, and is set based on the unsolved defect quantity that is recorded in a memory unit (not shown) every time a defect is solved. The monthly total defect quantity indicates the monthly total number of defect occurrences, and is set by adding up the number of defect occurrences of the present month contained in the defect occurrence information 390 of each defect code. The planned yield is the planned rate of production, and is set based on the planned yield recorded in a memory unit (not shown). The achieved yield is the actual rate of production, and is set based on the unsolved defect quantity.

The processing indicator 154 indicates the productivity in the processing of each processing facility. More specifically, the processing indicator 154 indicates a parts number, a designation identifier, a facility name, a condition, a planned time, a performance time, the difference between the planned time and the performance time, a suspension time, a planned tact time, an actual tact time, and the difference between the planned tact time and the actual tact time. Here, the facility name, the parts number, and the designation identifier are set based on the processing facility identifier, the parts number, and the designation identifier contained in the corresponding production plan information 340. The condition is set based on the setting of each time and date contained in the corresponding performance time information 360. The planned time is set based on the planned time recorded in a memory unit (not shown). The performance time is set based on the period of time between the processing start time and date and the processing end time and date contained in the corresponding performance time information 360. The difference between the planned time and the performance time is set by subtracting the planned time from the performance time. The suspension time is set by calculating the period of time between the processing start time and date and the processing end time and date contained in the corresponding performance time information 360, based on the suspension start time and date and the suspension end time and date contained in the corresponding facility suspension history information 400. The planned tact time is a tact time allocated to each one part in each production plan, and is recorded in a memory unit (not shown). The actual tact time is set by dividing the performance time by a produced quantity. The produced quantity can be obtained by adding up the processed quantity contained in the read information 370 of each designation identifier. The difference between the planned tact time and the actual tact time is set by subtracting the planned tact time from the actual tact time.

The control computer 31 calculates an actual processing time by subtracting the suspension time from the performance time, based on the processing start time and date and the processing end time and date contained in the corresponding performance time information 360 and the suspension start time and date and the suspension end time and date contained in the corresponding facility suspension history information 400. The control computer 31 also calculates an actual tact time by dividing the actual processing time by the produced quantity. The control computer 31 then records the obtained actual processing time and the actual tact time as the daily information, and has it displayed on a display screen (not shown).

The setup indicator 155 indicates a parts number, a designation identifier, a facility name, a condition, a planned time, a performance time, and the difference between the planned time and the performance time, for each of the pre-processing step and the post-processing step with respect to each processing facility. Here, the facility name, the parts number, and the designation identifier are set based on the processing facility identifier, the parts number, and the designation identifier contained in the corresponding production plan information 340. The condition is set based on the setting of each time and date contained in the corresponding performance time information 360. The planned time is set based on the planned time recorded in a memory unit (not shown). The performance time of each pre-processing step is set as the period time between the pre-processing start time and date and the pre-processing end time and date contained in the corresponding performance time information 360. The performance time of each post-processing step is set as the period of time between the post-processing start time and date and the post-processing end time and date contained in the corresponding performance time information 360. The difference between the planned time and the performance time is set by subtracting the planned time from the performance time.

The facility suspension indicator 156 indicates a facility name, a cause of suspension, a suspension start time, a suspension end time, and a suspended period of time, with respect to each processing facility. The facility name, the cause of suspension, the suspension start time, and the suspension end time are set based on the processing facility identifier, the cause of suspension, the suspension start time and date, and the suspension end time and date contained in the corresponding facility suspension history information 400. The suspension period of time is set as the period between the suspension start time and the suspension end time.

Based on the information displayed on the display screen 150, the manager determines whether the parts processing is being carried out according to the designated production plan, and adjust the environments for a desirable parts processing operation according to the designated production plan. For instance, the manager checks an excess or shortage in the completion quantity with respect to the planned quantity through a checking operation on the cause of delay or advance. As for the cause of delay, the manager determines from the "monthly total excess or shortage quantity" whether the delay has been gradually caused, determines from the "defect quantity" whether the delay is due to a problem in quality, and determines from the "suspension time" whether the delay is due to a problem in the facility. Also, the manager determines from the "performance time in the setup" whether the delay is due to a problem in the setup, and determines from the "difference between the planned tact time and the actual tact time" whether the delay is due to a difference in the planned setup time. As for the cause of advance, the manager determines from the "planned yield" and the "achieved yield" whether the parts processing is being performed at a higher yield than the yield set in the production plan. Also, the manager determines from the "difference between the planned tact time and the actual tact time" whether the parts processing is being performed in advance of the planned tact time, and determines from the "difference between the planned time and the performance time in setup" whether the operation is being performed in advance of the planned setup time.

To carry out the parts processing in accordance with the designated production plan, the manager makes an extractive evaluation of the improvement potential for production improvement. For instance, the manager evaluates the "actual tact time" to improve the processing tact time, evaluates the "performance time in setup" to shorten the setup time, evaluates the "achieved yield" to improve the quality, and evaluates the "suspension time" to reduce facility suspensions.

Also, the reference values based on the performance is reflected in schedule planning. More specifically, the "performance time in setup" is reflected in the planned time for setup, the "actual tact time" is reflected in the planned tact time, and the "achieved yield" is reflected in the planned yield. Further, based on the "stocked quantity" and the "unsolved defect quantity", the manager grasps the number of stocked complete parts and the number of processed parts to be examined, and these numbers are immediately reflected in stocking.

Furthermore, the information recorded in the memory units 36 through 41 in accordance with the reports 162, 163, 165, 166, 167, and 168, is reflected in a new production plan.

In accordance with the embodiment described so far, the following effects can be obtained.

In the above described embodiment, the control computer 31 calculates the necessary number of storage boxes 164 from the number of parts that can be stored in one storage box 164 and the planned quantity of processed parts. The control computer 31 then has the packaging cards 140 printed out. To the packaging cards 140, storage box identifiers in the form of serial numbers are allocated under each designation identifier. Thus, storage box identifiers can be allocated to the necessary number of storage boxes 164, and the parts completion report 165 for each storage box 164 can be made in accordance with each corresponding packaging card 140.

In the above described embodiment, the information as to the designation identifier, the storage box identifier, and the planned quantity that are recorded as the bar code 149 printed on each of the packaging cards 140 is read and then recorded as well as the read time. Thus, the operation of inputting designation identifiers, storage box identifiers, and planned quantities can be simplified.

In the above described embodiment, the control computer 31 records the performance time information 360 for each designation identifier. Thus, the execution state of each designation identifier can be immediately monitored.

In the above described embodiment, the control computer 31 changes the functions of the OK button 93, based on the setting of each time and date contained in the performance time information 360. Thus, the operation can be simplified, and a wrong input can be avoided.

In the above described embodiment, the control computer 31 determines whether there are a pre-processing step and a post-processing step, based on the pre-processing flag and the post-processing flag contained in the corresponding processing information 330. Thus, setup instructions can be issued only in stages having setup steps.

In the above described embodiment, the display screen 80 displays the production planned quantity and the produced quantity for a designated production plan. Also, the display screen 110 displays the planned quantity and the produced quantity for each instruction. Thus, an operator can recognize the produced quantity and compare the produced quantity with the planned quantity with respect to each designation identifier.

In the above described embodiment, the difference between the read times and dates contained in the corresponding read information 370, so that the performance time for each storage box 164 is determined. Thus, the performance time for each storage box 164 can be obtained, without an input of the performance time for each storage box 164.

In the above described embodiment, the control computer 31 determines whether there are unread bar codes 149, in accordance with an unread confirmation inputted through the unread button 83. Thus, all the production information read from the bar codes 149 can be certainly reported.

In the above embodiment, the control computer 31 records the defect occurrence time and date in the defect occurrence information 390 as the time and date when a defect occurrence report is inputted through the display screen 80 or the display screen 110. Thus, more accurate time and date can be recorded as the defect occurrence time and date. Further, the defect occurrence time and date are compared with the read time and date of the corresponding packaging card 140, so that which storage box 164 the parts having the defect is contained in can be easily detected.

In the above described embodiment, defect contents are recorded in association with defect codes. If defect contents having no codes are inputted, the control computer 31 allocates a new defect code associated with the defect contents. Thus, the operation of inputting defect contents can be simplified.

In the above described embodiment, the facility suspension history information 400 is recorded with respect to each processing facility identifier. Accordingly, the cause of suspension and the suspension time can be easily grasped at each processing facility. Also, data to be reflected in new production plans can be accumulated. Further, even if the processing is suspended, the suspension time is subtracted from the entire operation time of the processing facility, so as to obtain the actual processing time.

In the above described embodiment, the start times and the end times of the pre-processing, the main processing, and the post-processing, are recorded in the performance time memory unit 36. Thus, the operating periods of time of the preprocessing, the main processing, and the post-processing, can be readily obtained.

In the above described embodiment, a designation identifier is allocated to each planned date, each processing facility, and each parts number. Accordingly, the parts processing stages can be controlled for the parts processing plan in a predetermined period of time (one day, for example) at predetermined processing facilities.

In the above described embodiment, the control computer 31 changes the functions of the stop/turn-off button 105 of the display screen 80, depending on the condition of the processing facility. Thus, the operation of inputting an operating condition report as to the facility can be simplified.

In the above described embodiment, the control computer 31 automatically produces the daily report information 169, and displays it on the display screen 150 that serves to display production daily reports. Thus, from the display screen 150, the accumulated data can be monitored. More specifically, information such as the number of produced parts, a processing delay, and defect occurrences, can be monitored. Also, the actual tact time of each one part can be compared with the planned tact time of the part for each designation identifier, so that the productivity can be examined. Further, the setup time can be known with respect to each designation identifier, and can be compared with the setup time in accordance with the designated production plan. Moreover, the suspension condition of each facility can be monitored.

The above embodiment may be modified in the following manners.

Although the processing time is calculated and the processing time information 380 is recorded at the same time as the recording of the read information 370, the calculation of the processing time and the recording of the processing time information 380 may be performed anytime after the read information 370 is recorded. For example, the calculation of the processing time and the recording of the processing time information 380 may be performed at the time of producing a daily report In such a case, the order of performance inputs can be determined from the read times and dates.

In the above embodiment, the defect codes are inputted through the display screen 130. Alternatively, the defect codes may be contained in the bar codes 149, and be listed therein. The input of each defect code may be performed by reading the bar code 149 in which the defect codes are listed. If the defect code corresponding to the contents of a defect occurred does not exist in the bar code 149, a means of inputting defect contents is provided, and the control computer 31 may allocate a defect code to the inputted defect contents. The control computer 31 then outputs the bar code 149 in which the information of the new defect code is recorded. When the same defect occurs again, the input of the new defect code can be performed by reading the outputted bar code 149. Thus, the operation of inputting a defect report by an operator can be simplified.

In the above embodiment, the control computer 31 produces the daily report information 169, and has it displayed on the display screen 150. However, the items contained in a production daily report to be outputted are not limited to the items displayed on the display screen 150, but may be anything as long as it is determined from the information recorded in the memory units 31 through 41 and the other memory units (not shown), and relates to the parts processing stage control. For example, the processing time required for a unit number of parts, or the productivity of each facility (the processing time required for a unit number of parts at each facility) may be calculated. By doing so, the obtained information can be efficiently used and reflected in new production plans. Thus, the productivity can be increased as a whole.

In the above embodiment, a packaging card is issued for each storage box 164, and a performance report is made for each storage box 164. However, a unit of completed parts for which a performance report is made can take any number as long as the unit collectively contains completed parts. For example, a performance report may be made for each unit of completed parts to be stored in each storage means that is different from the storage boxes 164.

In the above embodiment, operators store parts in each storage box 164 after the parts are completed. However, the storing of completed parts in the storage boxes 164 and the input of performance reports may be automated.

In the above embodiment, a designation identifier is allocated to each one operation day. Alternatively, a designation identifier may be allocated to a longer period of time or a shorter period of time than one day.

In the above embodiment, when the performance report input through the reading of the bar codes 149 is not allowed, or when there are unread bar codes 149 as a result of an unread code checking operation with respect to the bar codes 149, an alert is outputted to and displayed on the operation terminal 46. In such a case, an alert may be outputted in some other form. For example, an alert sound may be generated.

In the above embodiment, the production control server 30 is connected to the operation terminal 46 and the control terminal 47 via the network 45. The network 45 may be a LAN, a WAN, a private line, a public switched line, the Internet, an intranet, or an extranet (a wide-area network).

In the above embodiment, the memory units 31 through 41 are provided in the production control server 30. However, those memory units 31 through 41 may be located in other separate places.

It should be noted that the present invention is not limited to the embodiments specifically disclosed above, but other variations and modifications may be made without departing from the scope of the present invention

What is claimed is:

1. A method of controlling a parts processing stage by means of a computer, the method comprising the steps of:
   dividing a processing planned quantity recorded in a processing plan memory into a plurality of units;
   recording a start time of a parts processing operation in a start time memory;
   recording the time of a completion report as to the parts processing operation carried out for each unit number of parts, the unit number being equivalent to each of the units, the processing planned quantity of parts being a processing planned quantity of parts to be processed at a predetermined parts processing facility in a predetermined period of time,
   recording a designation identifier with respect to a designating parts processing plan, in an execution designation identifier memory;
   recording the designation identifier recorded in the execution designation identifier memory, as information that is readable by the reading means, on the medium outputted in the step of outputting the medium;
   comparing a designation identifier read by the reading means with designation identifiers recorded in the execution designation identifier memory; and
   outputting an alert when the designation identifier read by the reading means is not the same as any of the designation identifiers recorded in the execution designation identifier memory as a result of the comparing step,
   the steps being carried out by the computer.

2. The method as claimed in claim 1, wherein the unit number is equal to a storage capacity number that indicates the number of parts that can be stored in each one storage means for storing completed parts for which the parts processing operation has been completed in the parts processing stage.

3. The methods as claimed in claim 2, wherein the step of dividing the processing planned quantity includes the steps of:
   calculating the number of storage means required for storing all the completed parts, based on the storage capacity number with respect to each storage means and the processing planned quantity; and
   allocating a storage means identifier for identifying each of the calculated number of storage means required for storing all the completed parts.

4. The method as claimed in claim 2, further comprising the step of outputting a medium on which the storage means identifier and the storage capacity number are recorded as information that can be read by a reading means, the step being carried out by the computer,
   wherein the step of recording the time of a completion report includes the steps of:
   reading the information by the reading means from the medium outputted in the step of outputting the medium; and
   recording the time of a completion report based on the read time of the information, while also recording the storage means identifier and the storage capacity number contained in the information that has been read by the reading means.

5. The method as claimed in claim 4, further comprising the steps of:
   recording the storage means identifier in a storage means identifier memory;
   accepting a completion report input with respect to the parts processing operation;
   comparing a storage means identifier read by the reading means with storage means identifiers recorded in the storage means identifier memory, when a completion report input is accepted in the step of accepting a completion report input; and
   outputting an alert when the storage means identifier read by the reading means is not the same as any of the storage means identifiers recorded in the storage means identifier memory, as a result of the comparing step,
   the steps being carried out by the computer.

6. The method as claimed in claim 1, further comprising the step of calculating a processing time required for processing the unit number of parts, from the start time of the parts processing operation and the time of the completion report, the step being carried out by the computer.

7. The method as claimed in claim 1, further comprising the steps of:
   recording a processing suspension start time that indicates the time of suspending the parts processing operation, in a processing suspension start time memory;
   recording a processing resumption time that indicates the time of resuming the suspended parts processing operation, in a processing resumption time memory; and
   calculating an actual processing time required for processing the unit number of parts, from the processing time, the processing suspension start time, and the processing resumption time,
   the steps being carried out by the computer.

8. The method as claimed in claim 1, wherein the parts processing stage is divided into a preparation stage and a main processing stage that are essential for the parts processing operation,
   the method further comprising the steps of:
   recording a start time and a finish time of each of the preparation stage and the main processing stage, in a divided stage time memory; and
   calculating an operation time of a parts processing facility in each of the divided stages, based on the start times and end times recorded in the divided stage time memory,
   the steps being carried out by the computer.

9. The method as claimed in claim 1, further comprising the steps of:
   accepting a defect occurrence input through an input means into which a defect occurrence report is inputted;
   accepting a defect contents input through an input means into which defect contents corresponding to the defect occurrence input are inputted; and associating defect information such as the time of the defect occurrence input and the defect contents with a designation identifier for identifying the parts processing stage designated in each parts processing plan, and then recording the defect information in a defect information memory in association with the designation identifier, the steps being carried out by the computer.

10. The method as claimed in claim 9, further comprising the step of outputting a medium on which code information classified under defect contents is recorded as information that can be read by a reading means, the step being carried out by the computer, wherein the step of associating defect information includes the steps of:

reading the information recorded on the medium; and recording the defect contents based on the code information contained in the information read by the reading means.

11. A program to control a parts processing stage by means of a computer, in which the computer functions as:

a divider that divides a processing planned quantity of parts recorded in a processing plan memory into a plurality of units, wherein the processing planned quantity of parts is a processing planned quantity of parts to be processed at a predetermined parts processing facility in a predetermined period of time;

a start time memory in which a start time of a parts processing operation is recorded;

a report acceptance memory in which the time of a parts completion report as to the parts processing operation carried out for each unit number of parts is recorded, the unit number being equivalent to each of the units;

a designation identifier recorder that records the designation identifier with respect to the designating parts processing plan, in an execution designation identifier memory;

an information recorder that records the designation identifier recorded in the execution designation identifier memory, as information that is readable by the reading means, on the medium outputted by the outputting unit;

a designation identifier comparator that compares a designation identifier read by the reading means with designation identifiers recorded in the execution designation identifier memory; and an execution designation identifier alert outputting unit that outputs an alert when the designation identifier read by the reading means is not the same as any of the designation identifiers recorded in the execution designation identifier memory as a result of the comparison.

12. The program as claimed in claim 11, wherein the unit number is equal to a storage capacity number that indicates the number of parts that can be stored in each one storage means for storing completed parts for which the parts processing operation has been completed in the parts processing stage.

13. The program as claimed in claim 12, wherein the divider functions as:

a storage means number calculator that calculates the number of storage means required for storing all the completed parts, based on the storage capacity number with respect to each storage means and the processing planned quantity; and a storage means identifier allocating unit that allocates a storage means identifier for identifying each of the calculated number of storage means required for storing all the completed parts.

14. The program as claimed in claim 12, wherein:

the computer also functions as an outputting unit that outputs a medium on which the storage means identifier and the storage capacity number are recorded as information that can be read by a reading means; and the report acceptance memory reads the information by the reading means from the medium outputted from the outputting unit, and records the time of a completion report based on the read time of the information, while also recording the storage means identifier and the storage capacity number contained in the information that has been read by the reading means.

15. The program as claimed in claim 14, wherein the computer further function as:

a storage means identifier recorder that records the storage means identifier in a storage means identifier memory;

a completion report accepter that accepts a completion report input with respect to the parts processing operation;

a storage means identifier comparator that compares a storage means identifier read by the reading means with storage means identifiers recorded in the storage means identifier memory, when a completion report input is accepted by the completion report accepter; and a storage means identifier alert outputting unit that outputs an alert when the storage means identifier read by the reading means is not the same as any of the storage means identifiers recorded in the storage means identifier memory as a result of the comparison.

16. The program as claimed in claim 11, wherein the computer further functions as a processing time calculator that calculates a processing time required for processing the unit number of parts, from the start time of the parts processing operation and the time of the completion report.

17. The program as claimed in claim 11, wherein the computer further functions as:

a processing suspension start time recorder that records a processing suspension start time that indicates the time of suspending the parts processing operation, in a processing suspension start time memory;

a processing resumption time recorder that records a processing resumption time that indicates the time of resuming the suspended parts processing operation, in a processing resumption time memory; and an actual processing time calculator that calculates an actual processing time required for processing the unit number of parts, from the processing time, the processing suspension start time, and the processing resumption time.

18. The program as claimed in claim 11, wherein:

the parts processing stage is divided into a preparation stage and a main processing stage that are essential for the parts processing operation; and the computer further functions as:

a divided stage time recorder that records a start time and a finish time of each of the preparation stage and the main processing stage, in a divided stage time memory; and an operation time calculator that calculates an operation time of a parts processing facility in each of the divided stages, based on the start times and end times recorded in the divided stage time memory.

19. The program as claimed in claim 11, wherein the computer further functions as:

a defect occurrence input accepter that accepts a defect occurrence input through an input means into which a defect occurrence report is inputted;

a defect contents accepter that accepts a defect contents input through an input means into which defect contents corresponding to the defect occurrence input are inputted; and a defect information associating unit that associates defect information such as the time of the defect occurrence input and the defect contents with a designation identifier for identifying the parts processing stage designated in each parts processing plan, and then records the defect information in a defect information memory in association with the designation identifier.

20. The program as claimed in claim 19, wherein:

the computer further functions as an outputting unit that outputs a medium on which code information classified under defect contents is recorded as information that can be read by a reading means; and the defect information associating unit reads the information recorded on the medium, and records the defect contents based on the code information contained in the information read by the reading means.

\* \* \* \* \*